(12) United States Patent
Kazmi et al.

(10) Patent No.: US 10,531,451 B2
(45) Date of Patent: Jan. 7, 2020

(54) TIME ADVANCE FOR DUAL CONNECTIVITY

(71) Applicant: Telefonaktiebolaget LM Ericsson (publ), Stockholm (SE)

(72) Inventors: Muhammad Kazmi, Bromma (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 15/155,671

(22) Filed: May 16, 2016

(65) Prior Publication Data

US 2016/0345316 A1  Nov. 24, 2016

Related U.S. Application Data

(60) Provisional application No. 62/163,085, filed on May 18, 2015.

(51) Int. Cl.
*H04W 72/04* (2009.01)
*H04W 74/08* (2009.01)
*H04W 56/00* (2009.01)

(52) U.S. Cl.
CPC ... *H04W 72/0446* (2013.01); *H04W 56/0045* (2013.01); *H04W 72/0413* (2013.01); *H04W 74/0833* (2013.01); *H04W 56/00* (2013.01)

(58) Field of Classification Search
CPC ......... H04W 72/0446; H04W 72/0413; H04W 74/0833; H04W 56/0045; H04W 56/00
See application file for complete search history.

(56) References Cited

U.S. PATENT DOCUMENTS

| | | | | |
|---|---|---|---|---|
| 5,408,506 A | * | 4/1995 | Mincher | H04B 1/7156 370/507 |
| 2011/0207485 A1 | * | 8/2011 | Dimou | H04W 36/0055 455/507 |

(Continued)

OTHER PUBLICATIONS

Huawei, HiSilicon, "Analysis of synchronised and unsynchronised scenario in Dual Connectivity," 3GPP TSG-RAN WG4 Meeting #72, Dresden, Germany, Aug. 18-22, 2014, R4-144498, Downloaded by EPO on Sep. 1, 2014.

(Continued)

*Primary Examiner* — Walter J Divito
*Assistant Examiner* — Anthony Luo
(74) *Attorney, Agent, or Firm* — Baker Botts LLP

(57) ABSTRACT

According to some embodiments, a method in a wireless device operating in dual connectivity comprises determining a synchronization type associated with a dual connectivity operation; determining a maximum timing advance value based on the determined synchronization type; receiving a timing advance value from a network node; determining an adapted timing advance value using the received timing advance value and the determined maximum timing advance value; and transmitting an uplink radio signal using the adapted timing advance value. According to some embodiments, a method in a network node serving a wireless device operating in dual connectivity comprises determining a synchronization type associated with a dual connectivity operation; determining a maximum timing advance value based on the determined synchronization type; determining a timing advance value based on the maximum timing advance value; and transmitting the timing advance value to the wireless device for the wireless device to use for transmitting uplink signals.

28 Claims, 11 Drawing Sheets

(56) References Cited

U.S. PATENT DOCUMENTS

| | | | |
|---|---|---|---|
| 2013/0250925 A1* | 9/2013 | Lohr | H04W 72/0446 |
| | | | 370/336 |
| 2015/0078310 A1 | 3/2015 | Kreuzer et al. | |
| 2016/0219619 A1* | 7/2016 | Guo | H04W 72/14 |
| 2016/0360541 A1* | 12/2016 | Kim | H04W 76/023 |
| 2017/0048108 A1* | 2/2017 | Yi | H04W 56/00 |

OTHER PUBLICATIONS

PCT, Notification of Transmittal of the Internaitonal Search Report and the Written Opinion of the International Searching Authority, or the Declaration, Int'l Appln. No. PCT/IB2016/052907, dated Aug. 16, 2016.

Ericsson, "PCMAX definition and available UL processing time in UE for asynchronous dual conectivity," TSG-RAN Working Group 4 (Radio) Meeting #74bis, Rio de Janeiro, Brazil, Apr. 20-24, 2014, R4-151849 Downloaded by EPO Apr. 18, 2015.

* cited by examiner

TIME ADVANCE FOR DUAL CONNECTIVITY

RELATED APPLICATION

This application claims benefit under 35 U.S.C. § 119(e) to U.S. Provisional Application Ser. No. 62/163,085, entitled "TIME ADVANCE FOR DUAL CONNECTIVITY," filed May 18, 2015, the entire content of which is incorporated herein by reference.

TECHNICAL FIELD

Particular embodiments relate generally to wireless communications networks, and more particularly to a maximum timing advance for wireless devices operating in dual connectivity.

BACKGROUND

Dual connectivity refers to a wireless device that communicates using radio resources provided by at least two different network nodes (sometimes referred to as Master eNB (MeNB) and Secondary eNB (SeNB)) connected with non-ideal backhaul while the wireless device is in a connected state, such as a Third Generation Partnership Project (3GPP) long term evolution (LTE) user equipment (UE) in a RRC_CONNECTED state. A MeNB may also be referred to as an anchor node and the SeNB may also be referred to as a booster node. A wireless device in dual connectivity maintains simultaneous connections to the anchor and booster nodes. As the master node, the MeNB controls the connection and handover of SeNB. The SeNB does not perform handover on its own. To perform a SeNB change, the MeNB may signal a SeNB release and SeNB addition. Both the MeNB and SeNB can terminate the control plane connection towards the wireless device, thus both may be a controlling node of the wireless device.

The wireless device receives system information (e.g., SIBs) from the MeNB. In addition to the MeNB, the wireless device may be connected to one or more SeNB for added user plane support. In LTE, the MeNB and SeNB are connected via the Xn interface, which is currently the same as the X2 interface between two eNBs.

Specifically for LTE, dual connectivity is a UE operation mode in RRC_CONNECTED state where the UE is configured with a Master Cell Group (MCG) and a Secondary Cell Group (SCG). A MCG is a group of serving cells associated with the MeNB. The MCG may comprise a primary cell (PCell) and optionally one or more secondary cells (SCells). A SCG is a group of serving cells associated with the SeNB. The SCG may comprise a primary secondary cell (PSCell) and optionally one or more SCells. The MeNB terminates the S1-MME connection. The SeNB provides additional radio resources for the UE.

FIG. 1 is a block diagram illustrating an example dual connectivity network. Network nodes 220 serve one or more UEs 210. As one example of dual connectivity, UE 210a is operating in dual connectivity with network nodes 220a and 220b. Network node 220a is serving UE 210a as a MeNB, and network node 220b is serving UE 210a as a SeNB. As another example, UE 210d is operating in dual connectivity with network nodes 220c and 220d. Network node 220c is serving UE 210d as a MeNB, and network node 220d is serving UE 210d as a SeNB. In the illustrated examples, only one SeNB is connected to a UE. In general, however, more than one SeNB may serve a UE.

Dual connectivity is a wireless device specific feature, which means that a network node can support a dual connected wireless device and single carrier wireless devices at the same time. For example, in FIG. 1 network node 220a is a serving network node for UE 210b and a MeNB for UE 210a. Network node 220d is a serving network node for single carrier UE 210e and a SeNB for UE 210d. Typically, the dual links with MeNB and SeNB may belong to different carrier frequencies and even different frequency bands.

The role of master and secondary, or anchor and booster, are relative to a particular wireless device. For example, a network node may operate as an anchor for one wireless device and the same network node may operate as a booster for another wireless device. Thus, a network node may typically be capable of providing functions for both roles. For example, a wireless device operating in dual connectivity reads is system information from the anchor node. A booster node, however, may serve other wireless devices that are not operating in dual connectivity and may provide system information to those wireless devices.

In general, the MeNB provides system information, terminates the control plane, and may terminate the user plane. The SeNB terminates the user plane, and may terminate the control plane.

In one application, a wireless device is dual connected to two network nodes to increase its data rate by receiving data from both nodes. This may be referred to as user plane aggregation. User plane aggregation achieves similar benefits as carrier aggregation using network nodes that are not connected by a low-latency backhaul/network connection. Without a low-latency backhaul connection, the scheduling and HARQ-ACK feedback from the wireless device to each of the network nodes is performed separately. For example, a UE may have two uplink transmitters to transmit uplink control and data to the connected network nodes.

A dual connected wireless device may operate in a synchronized or unsynchronized mode. Because dual connectivity operation involves two non-co-located transmitters (i.e., MeNB and SeNB), one factor related to wireless device receiver performance is the maximum receive timing difference ($\Delta t$) of the signals from MeNB and SeNB received at the wireless device receiver. This timing difference is the reason for two modes of dual connectivity operation (synchronized and unsynchronized) with respect to the wireless device.

Synchronized operation refers to a wireless device that can perform dual connectivity operation provided the received time difference ($\Delta t$) between the signals received at the wireless device from the component carriers belonging to the MCG and SCG are within a certain threshold (e.g., ±33 µs). More specifically, synchronized operation means that the received time difference ($\Delta t$) at the wireless device between the subframe boundaries of the received component carriers belonging to the MCG and SCG are within a certain threshold (e.g., ±33 µs).

Unsynchronized operation refers to a wireless device that can perform dual connectivity operation regardless of the received time difference ($\Delta t$) between the signals received at the wireless device from the component carriers belonging to the MCG and SCG (i.e., for any value of $\Delta t$). More specifically, unsynchronized operation means that the received time difference ($\Delta t$) at the wireless device between the subframe boundaries of the received component carriers belonging to the MCG and SCG can be any value (e.g., more than ±33 µs, any value up to ±0.5 ms, etc.). A wireless device may be referred to as operating in synchronized or unsynchronized mode, or interchangeably as synchronous or asynchronous mode, respectively.

A wireless device may also be referred to as operating at a particular synchronization level. The synchronization level may be determined by the received time difference ($\Delta t$) between the signals received at the wireless device from the component carriers belonging to the MCG and SCG. For example, a wireless device with received time difference below a certain threshold, such as 33 µs, may be operating at a synchronous (or synchronized) level. A wireless device with received time difference above a certain threshold, such as 33 µs, may be operating at an asynchronous (or unsynchronized) level. The term synchronization type may refer generally to either a synchronization mode or level.

A wireless device may signal to the network node to indicate whether the wireless device is capable of synchronized and/or unsynchronized dual connectivity operation. The capability information may be associated with each band or band combination supported by the wireless device for dual connectivity operation. For example, a wireless device may indicate that it supports synchronized and unsynchronized dual connectivity operations for frequency band combinations, such as band 1+band 3, and band 7+band 8. Based on the received wireless device capability information, the network node can determine whether the wireless device should be configured for synchronized or unsynchronized dual connectivity operation for a particular band or band combination.

The maximum receive timing difference ($\Delta t$) at the wireless device consists of three main components: (1) relative propagation delay, which is expressed as the difference of propagation delay between MeNB and SeNB; (2) transmit timing difference related to synchronization levels between MeNB and SeNB antenna connectors; and (3) delay related to multipath propagation of radio signals from the MeNB and SeNB.

The relative propagation delay between MeNB and SeNB can be compared to the propagation delay in carrier aggregation. Carrier aggregation is designed for a maximum propagation delay of 30.26 µs for worst case non-co-located carrier aggregation coverage case. 30.26 µs corresponds to signal propagation distance of just over 9 km. In dense urban scenarios, the maximum misalignment related to propagation delay is typically around 10 µs. This is linearly related to the relative physical distance between the nodes. Thus, for dual connectivity, a large portion of the timing misalignment margin may not be required because of the shorter distance between nodes. This means the margin requirement may be relaxed to the synchronization accuracy between MeNB and SeNB (e.g., 3 µs). 3 µs is the co-channel synchronization accuracy requirement for TDD, which means that the tightest achievable requirement is 3 µs.

Another factor is the received time difference at the wireless device between signals from the MeNB and SeNB. For synchronized operation, the MeNB and SeNB transmit timing is synchronized to a particular level of time accuracy. For asynchronous operation, the synchronization accuracy may be any variance up to 1 ms, which is more relaxed than synchronized operation. The receive timing difference is the received timing misalignment between two received signals from subframe boundaries of MeNB and SeNB at the wireless device. It does not refer to the transmit timing mismatch levels between the MeNB and SeNB.

FIG. 2 is a block diagram illustrating maximum receive timing difference at a wireless device. The top example illustrates subframes transmitted from a MeNB and SeNB in synchronized operation. The bottom example illustrates subframes transmitted from a MeNB and SeNB in unsynchronized operation.

The maximum receive timing difference (MRTD) is illustrated by the arrow marking the time difference between the start of the subframe received from the MeNB and the start of the subframe received from the SeNB. In the top example (synchronized operation), the MRTD is within the range of 33 µs. In the bottom example (unsynchronized operation), the MRTD can be any value less than 1 ms.

For dual connectivity using dual transmit/receive components and a non-ideal backhaul, the MeNB and SeNB may typically not be synchronized with each other. Dual transmit/receive components mean that the separate links may be served by separate power amplifiers, which makes synchronization unnecessary. A wireless device that is capable of unsynchronized operation is likely also capable of synchronized operation.

Another factor is related to multipath delay in the radio environment. The received time difference of radio signals from MeNB and SeNB may include delay introduced by the multipaths on individual links based on the radio environment characteristics. For example, in a typical urban environment the delay spread of multiple paths received at the wireless device may typically be on the order of 1-3 µs. In wide areas like in suburban or rural deployment scenarios, however, the channel delay spread caused by multipath effect of the signals observed at the wireless device is relatively smaller (e.g. less than 1 µs).

In general, network-wide synchronization is not needed for dual connectivity because dual connectivity is a wireless device specific operation. A particular wireless device is connected to two network nodes in dual connectivity operation, thus any synchronization requirement between the two network nodes is only relevant when they serve the particular wireless device for dual connectivity operation (i.e., when the two network nodes are performing as MeNB and SeNB for the particular wireless device).

As described with respect to FIG. 1, the same MeNB and SeNB may also be serving other wireless devices not operating in dual connectivity. Thus, strict synchronization requirements between MeNB and SeNB are not necessary. However, for a wireless device operating in dual connectivity to receive signals from MeNB and SeNB within the maximum allowed received time difference, the wireless device needs to support particular requirements (e.g., measurement requirements, measurement accuracy requirements, RLM requirements, UE performance requirements, UE demodulation and CSI requirements, etc.). For example, the received time difference at the wireless device from the MeNB and the SeNB should be within a particular time limit, and the maximum transmit time difference between the MeNB and the SeNB should be within a particular time limit.

A wireless device may use timing measurements to estimate the received time difference between the MCG and the SCG. The wireless device may determine received time difference between the MCG and SCG based on a measurement which may be referred to as system frame number (SFN) and subframe time difference (SSTD) or SFN and subframe timing offset. The wireless device may use the SSTD autonomously and/or report it to one or more network nodes. The SSTD is defined by the following equation:

$$SSTD=[(SFN_i-SFN_j)*327200+x]*T_s$$

Where SFN indices in MeNB and SeNB are denoted with i and j, respectively; Ts is a basic time unit (Ts≈32.5 μs); and SFN and subframe time offset (Δt) is expressed as illustrated in FIG. 3.

FIG. 3 is a block diagram illustrating system frame number and subframe time offset estimation in SSTD measurement. Consecutive frames of the MeNB are labelled with system frame numbers i−1, i, i+1, and i+2. Consecutive frames of the SeNB are labelled with system frame numbers j−1, j, j+1, and j+2. The offset between the start of MeNB frame i and SeNB frame j is denoted as Δt.

LTE also specifies a timing relationship between uplink and downlink transmissions. Timing advance (TA) is a negative offset, at the wireless device, between the start of a received downlink subframe and a transmitted uplink subframe. This offset at the wireless device enables the downlink and uplink subframes to be synchronised at the network node.

FIG. 4 is a block diagram illustrating uplink-downlink timing relations. FIG. 4 illustrates a downlink radio frame and a corresponding uplink radio frame for system frame number i. The start of uplink radio frame i precedes the start of downlink radio frame i.

More specifically, The transmission of the uplink radio frame number i from the wireless device starts ($N_{TA}$+ $N_{TA\ offset}$)×$T_s$ seconds before the start of the corresponding downlink radio frame at the wireless device, where:

$0 \leq N_{TA} \leq 20512$ and $N_{TA\ Offset}=0$ for frame structure type 1 (i.e., LTE FDD); and $0 \leq N_{TA} \leq 20512$ and $N_{TA\ offset}=624$ for frame structure type 2 (i.e., LTE TDD).

The value of 624 Ts corresponds to 20 μs.

The uplink timing advance is maintained by the network node through timing advance (TA) commands sent to the wireless device. The network node may determine the timing advance, for example, based on measurements on uplink transmissions from the wireless device. Timing advance updates are signalled by the network node to the wireless device in MAC PDUs. For a TA command received in subframe n, the wireless device makes the corresponding uplink transmission timing adjustment at the beginning of subframe n+6.

Two network nodes located at different locations (non-collocated) may experience different propagation delays with respect to a wireless device, and thus the wireless device may use a different timing advance for uplink transmission to the two network nodes. Because maintaining a separate timing advance for each serving cell can be impractical, a timing advance group (TAG) consists of one or more serving cells with the same uplink timing advance and the same downlink reference cell.

The timing advance command for a TAG indicates the change of the uplink timing relative to the current uplink timing for the TAG as multiples of 16 Ts, where Ts=32.5 μs and is referred to as a basic time unit in LTE. A wireless device configured with at least two uplink serving cells (e.g., PCell and SCell) may be configured with two TAGs: pTAG and sTAG for a wireless device configured for uplink carrier aggregation, and pTAG and psTAG for a wireless device configured for dual connectivity operation. The same timing advance command is applicable for all serving cells in the same TAG (e.g., TA1 for PCell and SCell(s) belonging to pTAG, and TA2 for all SCell(s) belonging to sTAG).

If a wireless device is configured with inter-band carrier aggregation and also with multiple TAGs (e.g., pTAG and sTAG), then the wireless device is required to handle a maximum uplink transmission timing difference (ΔT) between the pTAG and the sTAG of at least 32.47 μs. A wireless device configured with pTAG and sTAG may stop transmitting on the SCell if, after a timing adjustment based on a received timing advance command, the uplink transmission timing difference between PCell and SCell exceeds the maximum value the wireless device can handle (i.e., 32.47 μs).

For dual connectivity, the value of ΔTAG depends on whether the wireless device is operating with synchronous or asynchronous dual connectivity. The values of maximum allowed ΔTAG can be up to 35.47 μs and 500 μs, depending on whether the wireless device is operating with synchronous or asynchronous dual connectivity. The MCG and SCG may likely use different duplex modes (e.g., MCG uses FDD and SCG uses TDD, or vice versa), in which case the maximum allowed ΔTAG may be larger. This is because of the 624 Ts (=20 μs) time offset in TDD between uplink and downlink frame timing, as illustrated in FIG. 4 described above. For example, the ΔTAG for synchronous TDD-FDD dual connectivity may be up to 55.47 μs.

A particular problem with dual connectivity, however, is that the wireless device receives the uplink control information (UCI) approximately 4 ms before the wireless device is to perform the actual uplink transmission. For a wireless device using ePDCCH, the wireless device waits until the end of subframe Q−4 for decoding the UCI information, which provides allocations for actual uplink transmission in uplink subframe Q. After applying the timing advance at the wireless device, the actual wireless device uplink transmission occurs after (3-TA) ms in any single carrier transmission. LTE specifications require a UE to support a maximum of 0.67 ms of maximum timing advance. Thus, the minimum available time for uplink processing (e.g., encoding a transport block) is reduced to 2.33 ms. Dual connectivity has a maximum of 0.5 ms subframe timing boundary mismatch, thus the minimum available processing time at the wireless device may be significantly smaller than 2.33 ms. This may impact a wireless device implementation, because performing the same transmit operations under the reduced time constraint requires significantly higher processing power.

SUMMARY

The embodiments described herein include limiting the maximum timing advance for a wireless device operating in dual connectivity. For example, a network node may send a timing advance command to a wireless device where the timing advance value is so large that the wireless device may not have time to encode the uplink transport block in the time between receiving the uplink control information and the time the wireless device is expected to transmit. Limiting the timing advance to a value appropriate for dual connectivity facilitates dual connectivity operation.

According to some embodiments, a method in a wireless device operating in dual connectivity comprises determining a synchronization type associated with a dual connectivity operation; determining a maximum timing advance value based on the determined synchronization type; receiving a timing advance value from a network node; determining an adapted timing advance value using the received timing advance value and the determined maximum timing advance value; and transmitting an uplink radio signal using the adapted timing advance value.

In particular embodiments, the method determines the received timing advance value is greater than the determined maximum timing advance value and sets the adapted timing advance value equal to the maximum timing advance value, sets the adapted timing advance value equal to no timing advance, stops transmission of uplink signals, or transmits a random access message to the network node of the plurality of network nodes.

In particular embodiments, the method further comprises transmitting an indication to the network node of the plurality of network nodes that the received timing advance value is greater than the determined maximum timing advance value.

In particular embodiments, the determined synchronization type associated with the dual connectivity operation is synchronous and the determined maximum timing advance value is approximately 0.67 milliseconds. In other embodiments, the determined synchronization type associated with the dual connectivity operation is asynchronous and the determined maximum timing advance value is approximately 0.136 milliseconds.

According to some embodiments, a method in a network node serving a wireless device operating in dual connectivity comprises determining a synchronization type associated with a dual connectivity operation; determining a maximum timing advance value based on the determined synchronization type; determining a timing advance value based on the maximum timing advance value; and transmitting the timing advance value to the wireless device for the wireless device to use for transmitting uplink signals.

In particular embodiments, the method further comprises receiving an indication from the wireless device that the timing advance value is greater than a maximum timing advance value determined by the wireless device and adapting the timing advance value using an updated maximum timing advance value.

In particular embodiments, the method further comprises determining the timing advance value is greater than the determined maximum timing advance value and transmitting, to the wireless device, a request to initiate a random access procedure or a request to change a serving cell of the wireless device. Particular embodiments may include receiving a random access message from the wireless device.

In particular embodiments, the determined synchronization type associated with the dual connectivity operation is synchronous and the determined maximum timing advance value is approximately 0.67 milliseconds. In other embodiments, the determined synchronization type associated with the dual connectivity operation is asynchronous and the determined maximum timing advance value is approximately 0.136 milliseconds.

According to some embodiments, a wireless device capable of operating in dual connectivity with a plurality of network nodes in a wireless communication network comprises a processor and a memory. The processor is operable to determine a synchronization type associated with a dual connectivity operation; determine a maximum timing advance value based on the determined synchronization type; receive a timing advance value from a network node of a plurality of network nodes; determine an adapted timing advance value using the received timing advance value and the determined maximum timing advance value; and transmit an uplink radio signal using the adapted timing advance value.

According to some embodiments, a network node capable of serving a wireless device operating in dual connectivity with a plurality of network nodes in a wireless communication network comprises a processor and a memory. The processor is operable to determine a synchronization type associated with a dual connectivity operation; determine a maximum timing advance value based on the determined synchronization type; determine a timing advance value based on the maximum timing advance value; and transmit the timing advance value to the wireless device for the wireless device to use for transmitting uplink signals.

According to some embodiments, a wireless device capable of operating in dual connectivity with a plurality of network nodes in a wireless communication network comprises a synchronization determining module, a maximum timing advance determining module, a timing advance adapting module, a receiving module, and a transmitting module. The synchronization determining module is operable to determine a synchronization type associated with a dual connectivity operation. The maximum timing advance determining module is operable to determine a maximum timing advance value based on the determined synchronization type. The receiving module is operable to receive a timing advance value from a network node of a plurality of network nodes. The timing advance adapting module is operable to determine an adapted timing advance value using the received timing advance value and the determined maximum timing advance value. The transmitting module is operable to transmit an uplink radio signal using the adapted timing advance value.

According to some embodiments, a network node capable of serving a wireless device operating in dual connectivity with a plurality of network nodes in a wireless communication network comprises a synchronization determining module, a maximum timing advance determining module, a timing advance determining module, and a transmitting module. The synchronization determining module is operable to determine a synchronization type associated with a dual connectivity operation. The maximum timing advance determining module is operable to determine a maximum timing advance value based on the determined synchronization type. The timing advance determining module is operable to determine a timing advance value based on the maximum timing advance value. The transmitting module is operable to transmit the timing advance value to the wireless device for the wireless device to use for transmitting uplink signals.

Also disclosed is a computer program product. The computer program product comprises instructions stored on non-transient computer-readable media which, when executed by a processor, perform the acts of determining a synchronization type associated with a dual connectivity operation; determining a maximum timing advance value based on the determined synchronization type; receiving a timing advance value from a network node; determining an adapted timing advance value using the received timing advance value and the determined maximum timing advance value; and transmitting an uplink radio signal using the adapted timing advance value.

Another computer program product comprises instructions stored on non-transient computer-readable media which, when executed by a processor, perform the acts of determining a synchronization type associated with a dual connectivity operation; determining a maximum timing advance value based on the determined synchronization type; determining a timing advance value based on the maximum timing advance value; and transmitting the timing advance value to the wireless device for the wireless device to use for transmitting uplink signals.

Particular embodiments may exhibit some of the following technical advantages. Particular embodiments change the allowable maximum timing advance for asynchronous dual connectivity operation, which provides a wireless device sufficient time to process an uplink transmission in dual connectivity without increasing the complexity or processing power of the wireless device. Particular embodiments may adjust the maximum timing advance value based on the wireless device capability or based on a current synchronization and operating scenario (e.g., maximum required cell range, wireless device distance from the network node, etc.). Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

A particular problem with dual connectivity is that in particular situations the timing advance for uplink transmission may be so large that a wireless device may not be able to process the uplink transmission in the time between receiving uplink control information (UCI) and the time the wireless device is to transmit. Particular embodiments obviate the problems described above and include limiting the maximum timing advance for a wireless device operating in dual connectivity. Particular embodiments change the allowable maximum timing advance for asynchronous dual connectivity operation, which provides a wireless device sufficient time to process an uplink transmission in dual connectivity without increasing the complexity or processing power of the wireless device. Particular embodiments may adjust the maximum timing advance value based on the wireless device capability or based on a current synchronization and operating scenario (e.g., maximum required cell range, wireless device distance from the network node, etc.).

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-11B of the drawings, like numerals being used for like and corresponding parts of the various drawings. LTE is used throughout this disclosure as an example cellular system, but the ideas presented herein may apply to other wireless communication systems as well.

Figure 5:
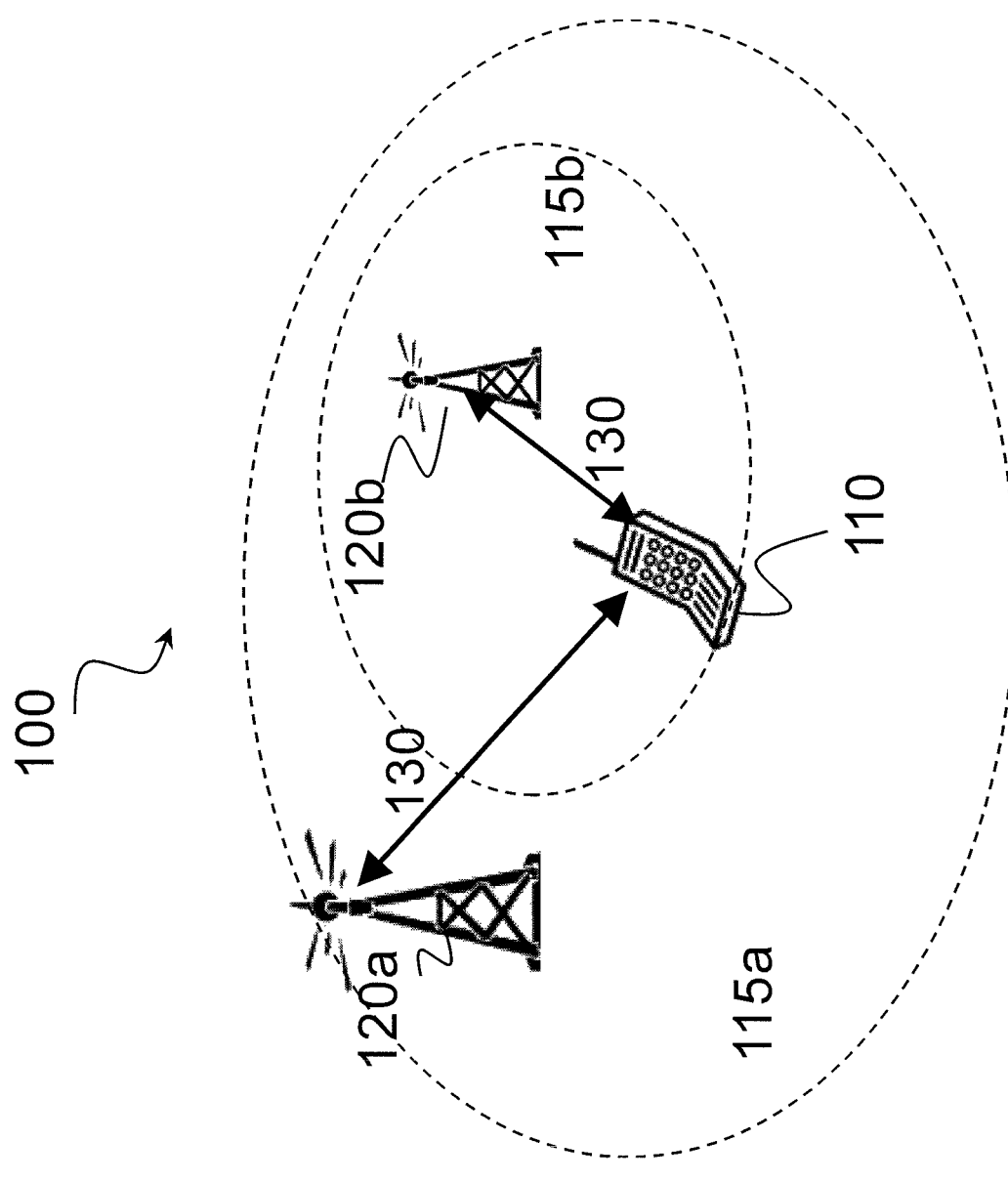
FIG. 5 is a block diagram illustrating an example wireless network, according to a particular embodiment.

FIG. 5 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120).

Wireless signal 130 may experience propagation delay between network node 120 and wireless device 110. To synchronize the uplink and downlink transmissions, network node 120 may determine a timing advance, for example, based on measurements on uplink transmissions from the wireless device. Network node 120 may communicate a timing advance command to wireless device 110.

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Figure 1:
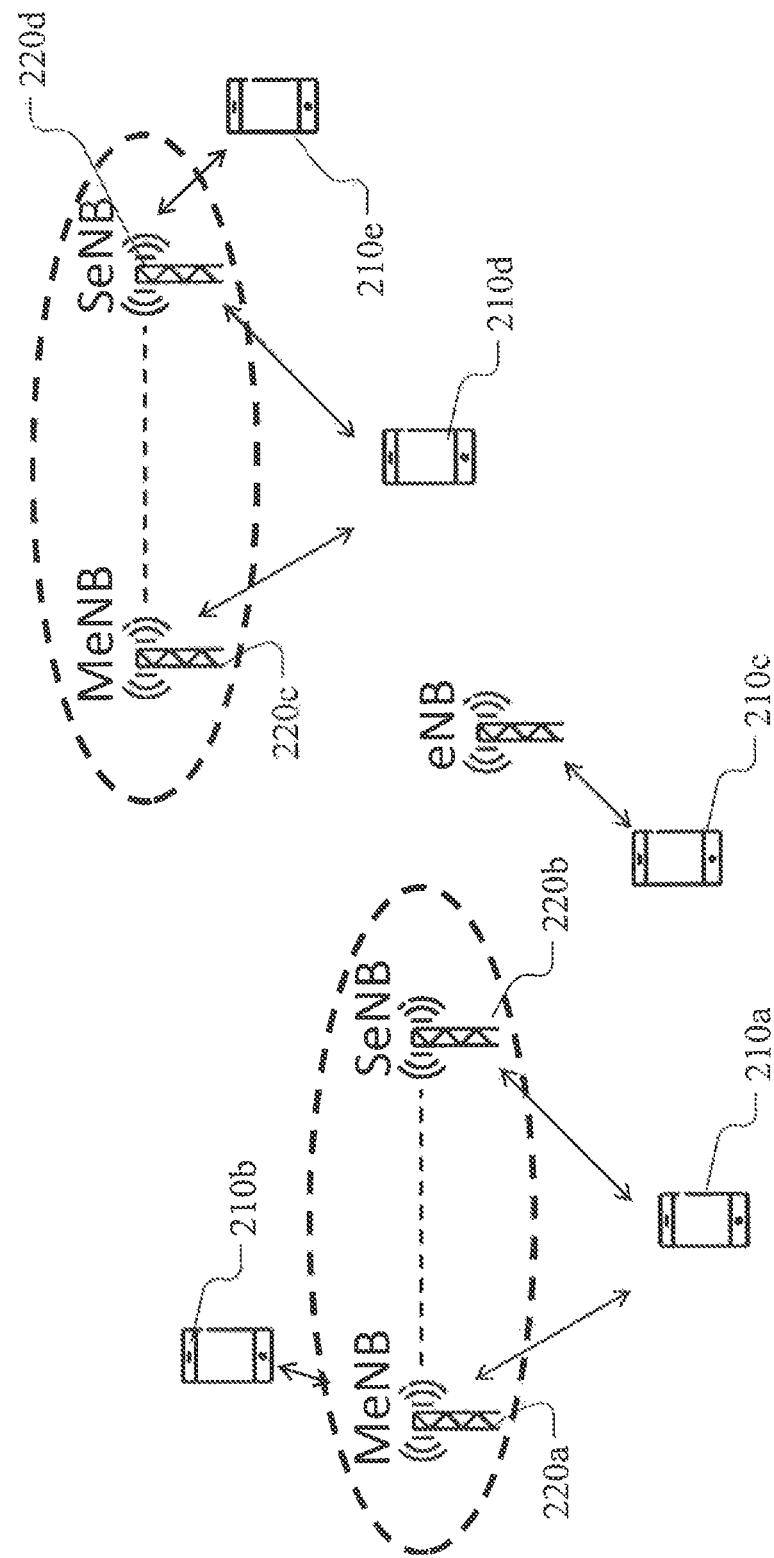
FIG. 1 is a block diagram illustrating an example dual connectivity network.
Figure 2:
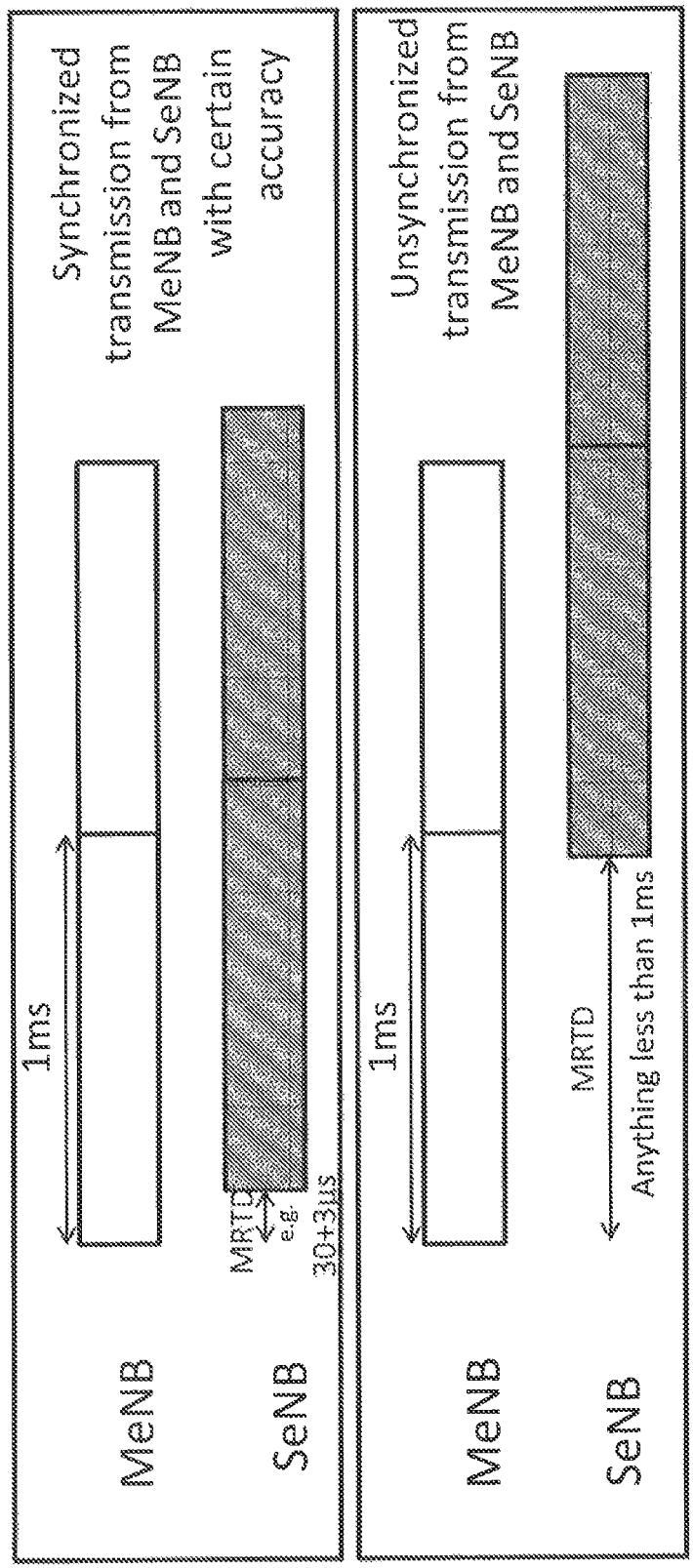
FIG. 2 is a block diagram illustrating maximum receive timing difference at a wireless device.
Figure 3:
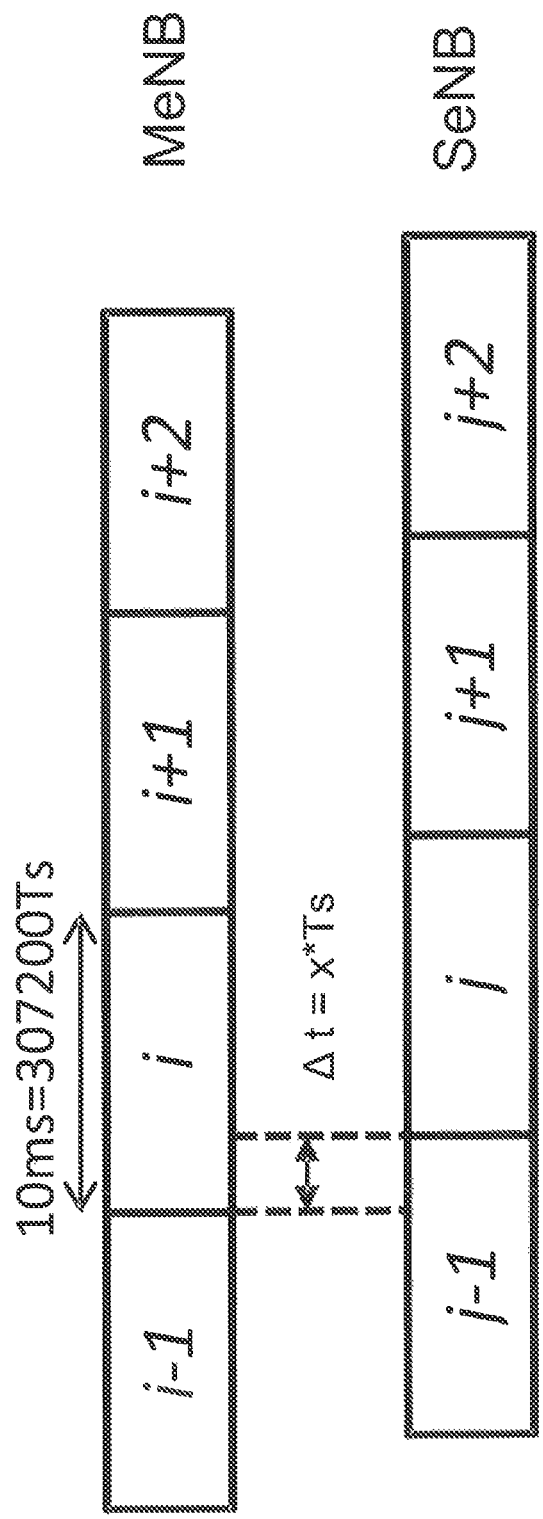
FIG. 3 is a block diagram illustrating system frame number and subframe time offset estimation in subframe time difference (SSTD) measurement.
Figure 4:
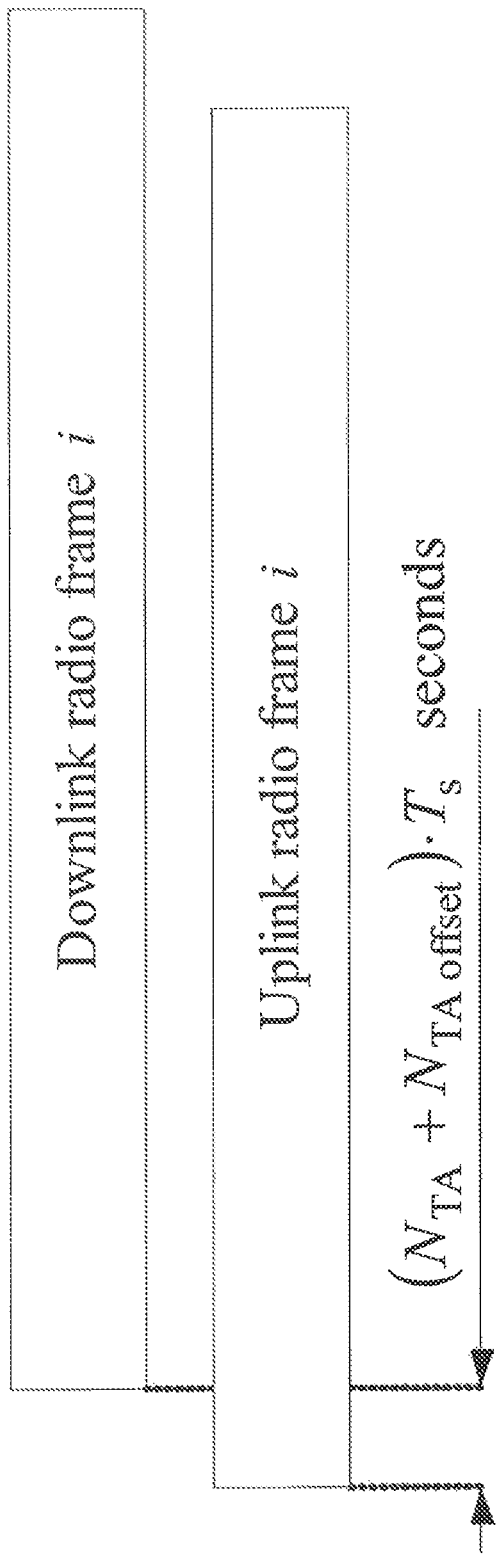
FIG. 4 is a block diagram illustrating uplink-downlink timing relations.

Similar to user equipment 210 and network nodes 220 described with respect to FIG. 1, wireless device 110 and network nodes 120 may operate in dual connectivity. For example, network node 120a may serve wireless device as a MeNB and network node 120b may serve wireless device 110 as a SeNB. Wireless device 110 may be operating in either synchronous or asynchronous dual connectivity.

Network node 120 may apply different radio procedures for the wireless device in different dual connectivity modes. For example, network node 120b may not schedule wireless device 110 in a subframe before or after a measurement gap when wireless device 110 operates in unsynchronized mode. In synchronized mode, however, network node 120b may schedule wireless device 110 in any subframe other than those in measurement gaps. Network nodes 120a and/or 120b may or may not inform wireless device 110 about which of the two modes wireless device 110 is configured for performing dual connectivity operation.

The network node may determine a suitable dual connectivity mode for a particular wireless device. Based on the determination, the network node may configure the wireless device in the determined dual connectivity mode and operate (e.g. schedule) the wireless device based on the configured dual connectivity mode.

In dual connectivity operation, wireless device 110 may experience different propagation delays between network node 120a and network node 120b. For uplink communication, wireless device 110 may receive a first timing advance command from network node 120a and a second timing advance command from network node 120b.

In particular embodiments, wireless device 110 may determine a synchronization type (e.g., synchronous or asynchronous) associated with the dual connectivity operation. Based on the determined synchronization type, wireless device 110 may determine a maximum timing advance value. For example, wireless device 110 may be operating in synchronous dual connectivity and determine a maximum timing advance value is 0.67 milliseconds. As another example, wireless device 110 may be operating in asynchronous dual connectivity and determine a maximum timing advance value is 0.136 milliseconds.

In particular embodiments, wireless device 110 may receive a timing advance value from network node 120a. Wireless device 110 may compare the received timing advance value with the determined maximum timing advance value. If the received timing advance value is less than the maximum timing advance value, then wireless device 110 may apply the received timing advance value for uplink transmission. If the received timing advance value is greater than the maximum timing advance value, then wireless device 110 may determine an adapted timing advance value. For example, wireless device 110 may use the maximum timing advance value for uplink transmission, may not apply any timing advance for uplink transmission, may not perform any uplink transmission, may notify network node 120a that the received timing advance value exceeded the determined maximum timing advance value, or make take any other suitable action or combination of actions. These and other actions taken by wireless device 110 are described in more detail below with respect to FIGS. 8A, 8B, 9A and 9B.

In particular embodiments, network node 120a may determine a synchronization type (e.g., synchronous or asynchronous) associated with the dual connectivity operation. Based on the determined synchronization type, network node 120a may determine a maximum timing advance value. For example, network node 120a may be operating in synchronous dual connectivity with wireless device 110 and determine a maximum timing advance value is 0.67 milliseconds. As another example, network node 120a may be operating in asynchronous dual connectivity with wireless device 110 and determine a maximum timing advance value is 0.136 milliseconds.

In particular embodiments, network node 120a may determine (e.g., based on propagation delay) a timing advance value for receiving uplink transmissions from wireless device 110. Network node 120a may compare the determined timing advance value with the determined maximum timing advance value based on dual connectivity. If the determined timing advance value exceeds the determined maximum timing advance value, network node 120a may adapt the determined timing advance value before sending a timing advance command to wireless device 110. Examples of adapting the determined timing advance value are described in more detail below with respect to FIGS. 8A, 8B, 9A and 9B.

In some embodiments, network node 120a may receive a notification from wireless device 110 that the timing advance value sent to wireless device 110 exceeds a determined maximum timing advance value. In response, network node 120a may calculate a dual connectivity mode of operation, a maximum timing advance value based on the calculated dual connectivity mode of operation, and adapt the timing advance value that it sends to wireless device 110 based on the recalculated information.

In particular embodiments network node 120b, operating as a SeNB, and wireless device 110 may perform similar interactions for uplink transmissions between wireless device 110 and network node 120b. Although a single SeNB is illustrated and described for simplicity, particular embodiments apply to any number of SeNBs and any number of component carriers in the uplink or downlink.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 10A below. Similarly, a network node may include any suitable combination of hardware and/or software. For example, in particular embodiments, a network node, such as network node 120, may include the components described with respect to FIG. 11A below.

The following embodiments include a general description of maximum timing advance scenarios in dual connectivity. Following the general description are descriptions of embodiments in a wireless device for determining a maximum timing advance and descriptions of embodiments in a network node for managing a maximum timing advance for a wireless device.

In particular embodiments, a wireless device is configured to operate in multiple (e.g., dual) connectivity. Dual connectivity operation includes at least a MeNB and a SeNB. The wireless device is further configured to operate in at least two cell groups (CGs) with at least one serving cell in each cell group (e.g., PCell in MCG and PSCell in SCG).

The wireless device may receive one or more timing advance commands from one or more network nodes (e.g. MeNB, SeNB, etc.) for adjusting the transmit timing on uplink signals transmitted by the wireless device in one or more serving cells (e.g., on one or more serving cells in MCG such as PCell and/or on one or more serving cells in SCG such as PSCell). For example, the wireless device may receive one timing advance command (TA1) from MeNB and apply this for adjusting uplink timing of signals transmitted on serving cells in MCG. The wireless device may also receive another timing advance command (TA2) from SeNB and apply this for adjusting uplink timing of signals transmitted on serving cells in SCG.

In conventional operation the wireless device may apply the received timing command without any modification to the received value. In the example embodiments described herein, however, a wireless device operating in dual connectivity may perform any of the following action(s), or combination of actions, related to the reception of the timing advance commands and the adjustment of the uplink timing based on the received command.

For example, the wireless device may evaluate one or more specific conditions and/or criteria associated with the dual connectivity operation and decide, based on the evaluation, whether to modify one or more received timing advance commands. In particular embodiments, the wireless device may apply either the received or modified timing advance value for adjusting the timing of its uplink transmissions in at least one serving cell.

Particular reasons for modifying the received timing advance value are described below with respect to FIGS. 6 and 7. As described above, in dual connectivity the worst case minimum available processing time at a wireless device to process a timing advance command will be significantly smaller than 2.33 ms (which is the conventionally available uplink processing time in carrier aggregation or single carrier uplink transmission).

Figure 6:
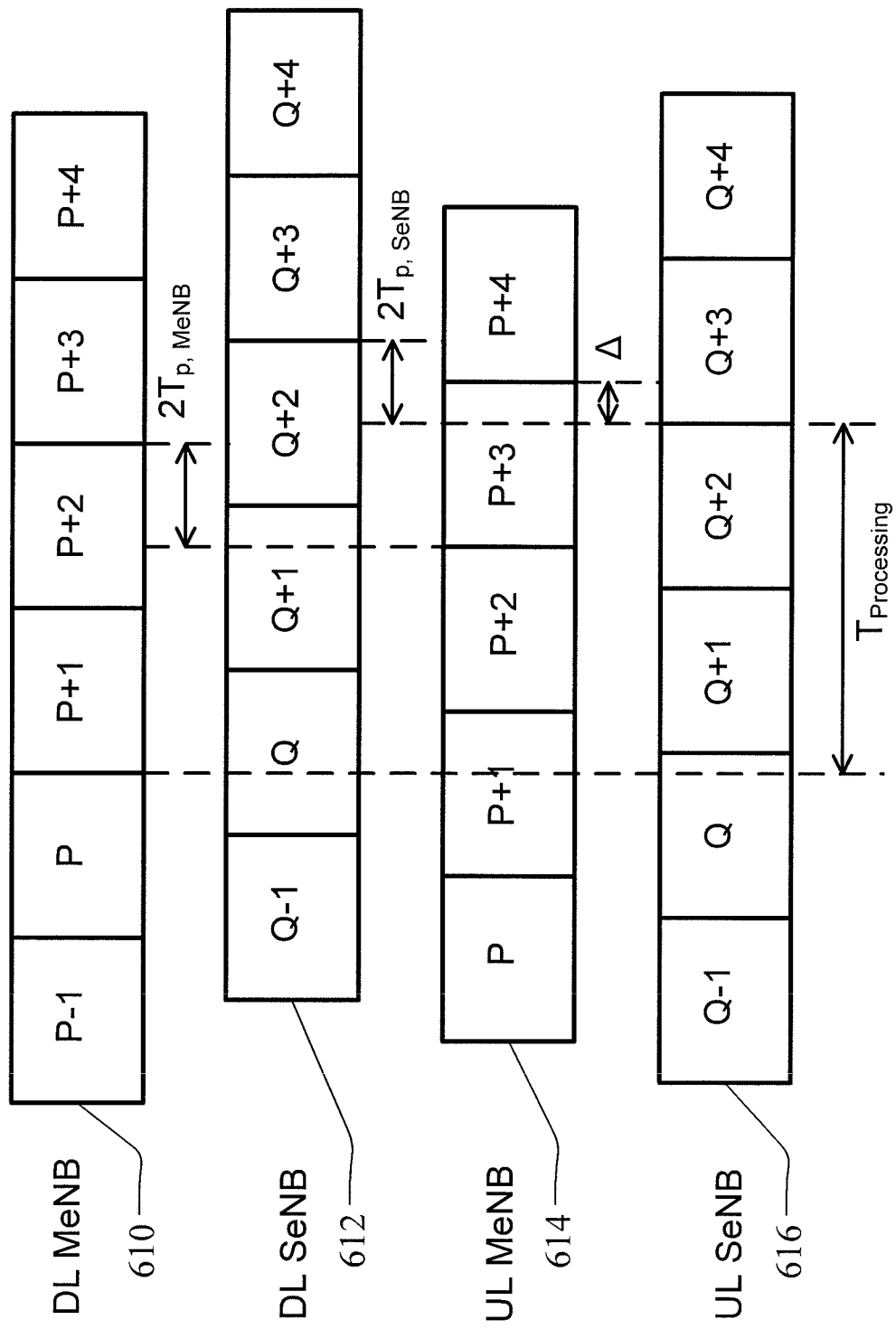
FIG. 6 is a block diagram illustrating available uplink processing time in dual connectivity when the secondary cell group (SCG) leads, according to some embodiments.

FIG. 6 is a block diagram illustrating available uplink processing time in dual connectivity when the secondary cell group (SCG) leads, according to some embodiments. FIG. 6 illustrates consecutive subframes in the downlink and uplink received from both a MeNB and SeNB, where the SeNB subframes lead. Consecutive subframes 610 comprise downlink subframes received from the MeNB. The individual subframes of consecutive subframes 610 are labeled P−1 to P+4. Consecutive subframes 612 comprise downlink subframes received from the SeNB. The individual subframes of consecutive subframes 612 are labeled Q−1 to Q+4. Consecutive subframes 612 are offset later in time from consecutive subframes 610. Consecutive subframes 614 comprise uplink subframes sent to the MeNB. The individual subframes of consecutive subframes 614 are labeled P to P+4. Consecutive subframes 616 comprise uplink subframes sent to the SeNB. The individual subframes of consecutive subframes 616 are labeled Q−1 to Q+4. Consecutive subframes 614 are offset later in time from consecutive subframes 616.

In the illustrated example, SeNB leads and SeNB uplink subframe Q+3 (of consecutive subframes 616) is the reference subframe. Uplink subframes P+4 (of consecutive subframes 614) and Q+3 (of consecutive subframes 616) are paired. $T_{processing}$ represents the time the wireless device has available to process an uplink transmission. As illustrated, the available uplink processing time at the wireless device may be reduced to 1.83 ms (i.e., reduced by 0.5 ms). For example, the available processing time in the uplink is:

$$T_{processing}=3-\Delta-TA_{MeNB} \text{ (ms)},$$

where $\Delta$ is the subframe timing boundary mismatch between MeNB and SeNB, which is at the max 0.5 ms, and $TA_{MeNB}$ is the timing advance applied to any uplink transmissions. When $TA_{MeNB}=0.67$ ms and $\Delta=0.5$ ms (both the worst cases), then $$T_{processing}=3-0.5-0.67 \text{ (ms)}=1.83 \text{ ms}.$$

Figure 7:
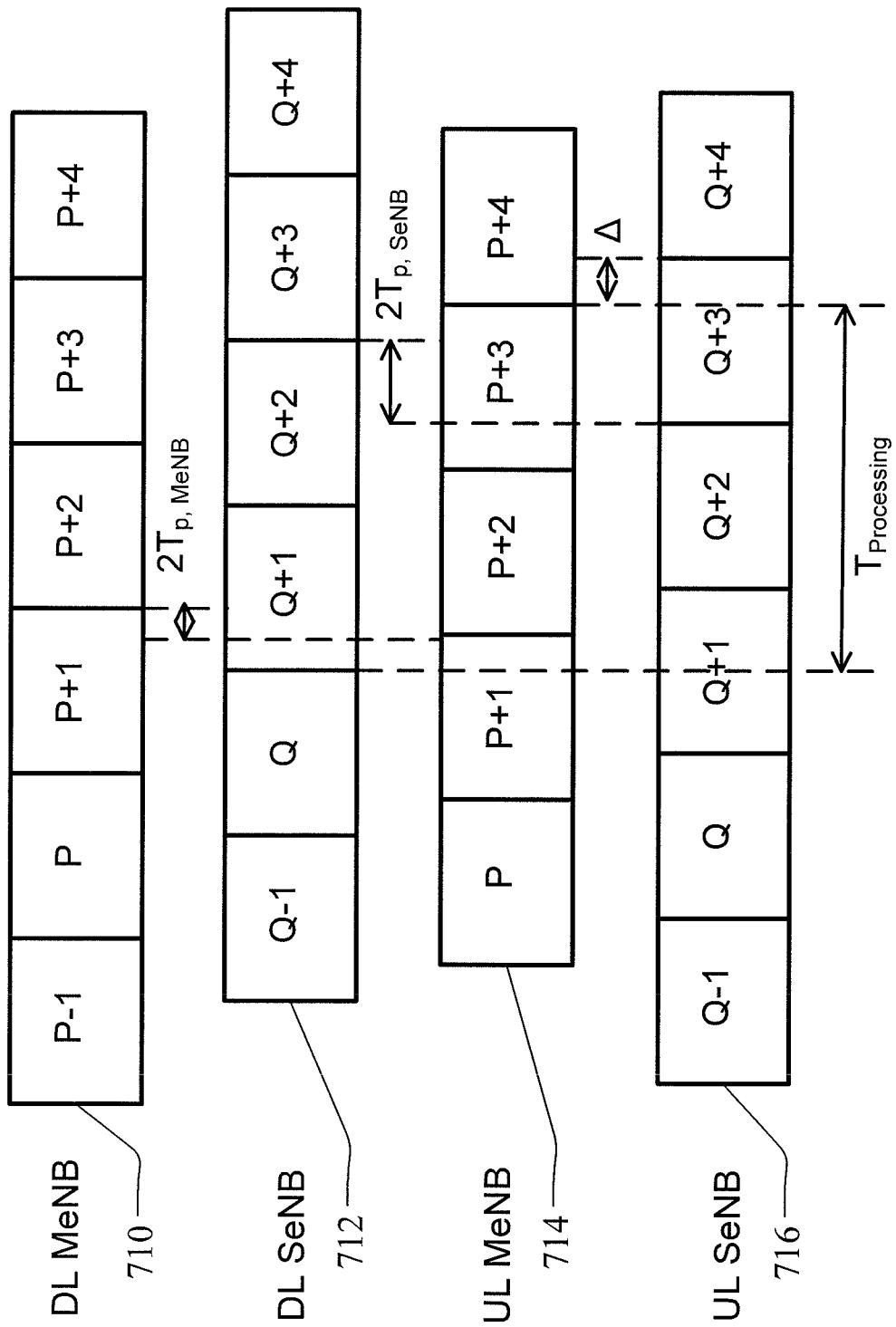
FIG. 7 is a block diagram illustrating available uplink processing time in dual connectivity when the master cell group (MCG) leads, according to some embodiments.

The same applies for the scenario when MCG leads as described with respect to FIG. 7.

FIG. 7 is a block diagram illustrating available uplink processing time in dual connectivity when the master cell group (MCG) leads, according to some embodiments. FIG. 7 illustrates consecutive subframes in the downlink and uplink received from both a MeNB and SeNB, where the MeNB subframes lead. Consecutive subframes 710 comprise downlink subframes received from the MeNB. The individual subframes of consecutive subframes 710 are labeled P−1 to P+4. Consecutive subframes 712 comprise downlink subframes received from the SeNB. The individual subframes of consecutive subframes 712 are labeled Q−1 to Q+4. Consecutive subframes 712 are offset later in time from consecutive subframes 710. Consecutive subframes 714 comprise uplink subframes sent to the MeNB. The individual subframes of consecutive subframes 714 are labeled P to P+4. Consecutive subframes 716 comprise uplink subframes sent to the SeNB. The individual subframes of consecutive subframes 716 are labeled Q−1 to Q+4. Consecutive subframes 714 are offset later in time from consecutive subframes 716.

In the illustrated example, MeNB leads and MeNB uplink subframe P+4 (of consecutive subframes 714) is the reference subframe. Uplink subframes P+4 (of consecutive subframes 714) and Q+4 (of consecutive subframes 716) are paired. $T_{processing}$ represents the time the wireless device has available to process an uplink transmission. As illustrated, the available uplink processing time at the wireless device may be reduced to 1.83 ms (i.e., reduced by 0.5 ms). For example, the available processing time in the uplink is:

$$T_{processing}=3-\Delta-TA_{seNB} \text{ (ms)},$$

where $\Delta$ is the subframe timing boundary mismatch between MeNB and SeNB, which is at the max 0.5 ms, and $TA_{seNB}$ is the timing advance applied to any uplink transmissions. When $TA_{seNB}=0.67$ ms and $\Delta=0.5$ ms (both the worst cases), then $$T_{processing}=3-0.5-0.67 \text{ (ms)}=1.83 \text{ ms}.$$

As illustrated by FIGS. 6 and 7 described above, the available uplink processing time for asynchronous dual connectivity is at the worst case 0.5 ms shorter (e.g., when maximum uplink timing advance is applied).

For carrier aggregation, a wireless device is capable of uplink transmission with maximum received time difference at the wireless device (i.e., up to 30.26 μs) and MTAG time differences up to 32.47 μs. These values correspond to approximately 9 km of distance between the wireless device and the network node. Thus, the received time differences between sites in different cell groups should be less than 30 μs even if the timing mismatch between cell groups can be much larger (e.g., up to 500 μs). Accordingly, the maximum received difference between cells within a cell group and between cells in different cell groups can be assumed to be the same. In addition, the timing advance on all cell groups can be large simultaneously and independently to each other. Based on these observations, dual connectivity operation between cell groups with about 667 μs of timing advance is not feasible.

Figure 8A:
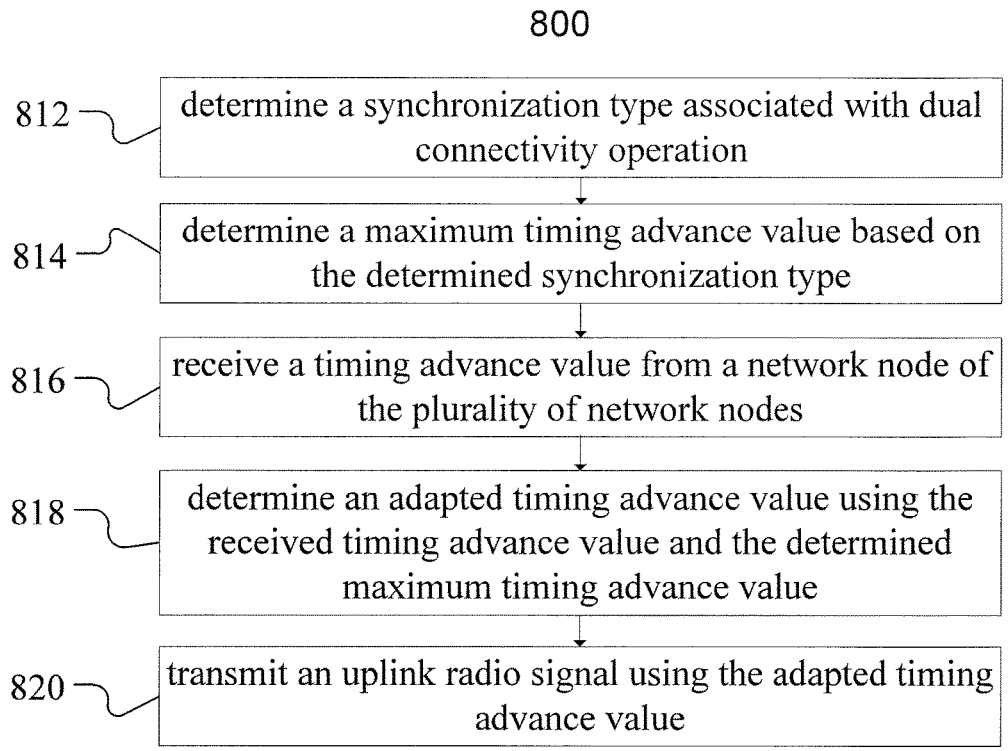
FIG. 8A is a flow diagram illustrating an example method in a wireless device of transmitting an uplink radio signal in dual connectivity, according to some embodiments.

Particular embodiments include methods whereby the max timing advance (TA_max) for dual connectivity operation is adjusted or changed by the wireless device and/or by the network node when one or more conditions are met. Particular embodiments adjust one or more timing advance commands (e.g., to certain TA_max) based on the dual connectivity synchronization mode (e.g., synchronous or asynchronous) of the wireless device FIG. 8A is a flow diagram illustrating an example method in a wireless device of transmitting an uplink radio signal in dual connectivity, according to some embodiments. In general, the method determines a maximum timing advance based on a dual connectivity synchronization type and adapts a timing advance command accordingly. In particular embodiments, one or more steps of FIG. 8A may be performed by a wireless device 110 of wireless network 100 described with respect to FIG. 5.

At step 812, a wireless device determines a synchronization type associated with dual connectivity operation. For example, wireless device 110 operating in dual connectivity with network nodes 120a and 120b may determine that the received time difference (Δt) between the signals received at wireless device 110 from the component carriers belonging to network nodes 120a and 120b is greater than 33 μs. Accordingly, wireless device 110 may determine that the dual connectivity synchronization type is asynchronous. In particular embodiments, wireless device 110 may use various mechanisms or procedures to determine its synchronization mode.

For example, a wireless device may determine the synchronization mode or level based on any one or more of the following activities. In particular embodiments, the wireless device capabilities for synchronous or asynchronous operation may only apply for certain frequency bands, which may be compared to the frequency bands used for the dual connectivity operation. The synchronization level or mode may be estimated based on the received time difference of signals from MeNB and SeNB (Δt) (e.g., synchronous dual connectivity if the magnitude of Δt is less than a particular threshold, otherwise asynchronous dual connectivity operation). The synchronization mode or level may be estimated based on the uplink time difference between TAGs (ΔMTAG) (e.g., synchronous dual connectivity if the magnitude of ΔMTAG is less than a particular threshold, otherwise asynchronous dual connectivity operation). Information about the wireless device receiver and/or transmitter architectures for dual connectivity operation may be used to determine the synchronization mode (e.g., if number of receivers and transmitters for dual connectivity is more than two, then the wireless device may be assumed to be capable of asynchronous dual connectivity, otherwise the wireless device may be assumed to be capable of synchronous dual connectivity. A frequency band or band combination used for dual connectivity may determine the synchronization mode (e.g., certain bands or band combinations may typically be used for synchronous mode and others for asynchronous mode). The wireless device may signal the band information to the network node, or vice versa.

The dual connectivity synchronization mode may change over time based on, for example, changes in the receive time difference at the wireless device (e.g., the wireless device may move from synchronized dual connectivity mode to unsynchronized dual connectivity mode if Δt becomes larger than 33 μs. As another example, the dual connectivity synchronization mode may also change over time based on changes in the configured carriers at the wireless device for dual connectivity (e.g., the wireless device may move from synchronized dual connectivity mode to unsynchronized dual connectivity mode if the frequency band of PCell and/or PSCell in MCG and SCG, respectively, are changed).

At step 814, the wireless device determines a maximum timing advance value based on the determined synchronization type. For example, wireless device 110 operating in asynchronous dual connectivity with network nodes 120a and 120b may determine that its maximum timing advance value is 0.136 ms. As another example, wireless device 110 operating in synchronous dual connectivity with network nodes 120a and 120b may determine that its maximum timing advance value is 0.67 ms. While particular maximum timing advance values are given as examples, particular embodiments may use any suitable maximum timing advance value.

In particular embodiments, the wireless device may determine the maximum timing advance value for the particular dual connectivity synchronization level based on any one or more of the following examples. In particular embodiments, the wireless device may determine the maximum timing advance based on its own capabilities. For example, the wireless device may determine the maximum timing advance based on the amount of time the wireless device takes to process the received timing advance command, process the uplink data, or any other suitable performance characteristic of the wireless device.

In particular embodiments, the wireless device may determine the maximum timing advance value based on an explicit maximum timing advance value received from a network node (e.g., signaled from the MeNB and/or eNB via RRC signaling). In particular embodiments, the wireless device may determine the maximum timing advance value based on a measurement of the receive time window difference between the MCG and SCG.

In particular embodiments, the wireless device may determine the maximum timing advance value based on one or more pre-defined relations between maximum timing advance values and the dual connectivity synchronization levels. Table 1 is an example of a pre-defined mapping and Table 2 is a more specific example of a pre-defined mapping.

TABLE 1

Maximum TA value as a function of dual connectivity synchronization level

| ID | Synchronization level in DC | Maximum TA value |
| --- | --- | --- |
| 0 | Synchronous DC | TA_max1 |
| 1 | asynchronous DC | TA_max2 |

TABLE 2

Mapping between dual connectivity synchronization level and maximum TA values

| ID | Synchronization level in DC | Maximum TA value |
|---|---|---|
| 0 | Synchronous DC | TA_max1 = 0.67 ms |
| 1 | asynchronous DC | TA_max2 = 0.136 ms |

At step 816, the wireless device receives a timing advance value from a network node of the plurality of network nodes. For example, wireless device 110 may receive a timing advance value from either one or both of network nodes 120a and 120b. The timing advance value may be based on propagation delay between network node 120 and wireless device 110. The timing advance value may or may not account for dual connectivity operation.

At step 818, the wireless device determines an adapted timing advance value using the received timing advance value and the determined maximum timing advance value. For example, wireless device 110 may compare the maximum timing advance value determined at step 814 with the timing advance value received at step 816. If the received timing advance value is less than the maximum timing advance value, then wireless device 110 may not have reason to adapt the received timing advance value. In this case the adapted timing advance value may be equal to the received timing advance value. If however, the received timing advance value exceeds the maximum timing advance value, wireless device 110 may adapt the received timing advance value. Various examples of how the wireless device may adapt the received timing advance value are described in more detail below with respect to FIG. 8B.

Generally, the wireless device may use the determined maximum timing advance value and the determined dual connectivity synchronization level to adapt one or more received timing advance commands from the network node. The wireless device may apply the adaptation to the received timing advance command when the received timing advance command includes a timing advance value that exceeds the maximum timing advance value corresponding to the determined synchronization level. For example, if the received timing advance command includes a timing advance value of 0.67 ms, and the wireless device is operating in asynchronous dual connectivity, then the received timing advance may be adapted to 0.136 ms.

As another example, when the wireless device determines that the maximum synchronization level is below a threshold (e.g. magnitude of Δt<33 µs) then the timing advance command may be limited to a first maximum timing advance value (TA_max1). Otherwise, when the synchronization level is equal to or larger than the threshold, then the timing advance command may be limited to a second maximum timing advance value (TA_max2). Typically TA_max1 is greater than TA_max2. Particular examples of TA_max1 and TA_max2 include 0.67 ms (=667 µs) and 0.136 ms (=133.54 µs), respectively. Particular embodiments enable the adjustment of one or more timing advance commands so that the timing advance commands do not exceed TA_max1 when the wireless device is operating or configured to operate in synchronous dual connectivity, and do not exceed TA_max2 when the wireless device is operating or configured to operate in asynchronous dual connectivity.

At step 820, the wireless device transmits an uplink radio signal using the adapted timing advance value. For example, wireless device 110 may transmit an uplink radio signal to network node 120 at the time specified by the adapted timing advance value.

Generally, the wireless device may apply the adapted one or more timing advance commands for adjusting the uplink transmit timing of one or more uplink signals transmitted in one or more serving cells involved in dual connectivity. The wireless device, after applying the adapted timing advance command on the uplink signals, transmits the uplink signals.

Modifications, additions, or omissions may be made to method 800. Additionally, one or more steps in method 800 of FIG. 8A may be performed in parallel or in any suitable order. All or parts of method 800 may be repeated over time as necessary.

Figure 8B:
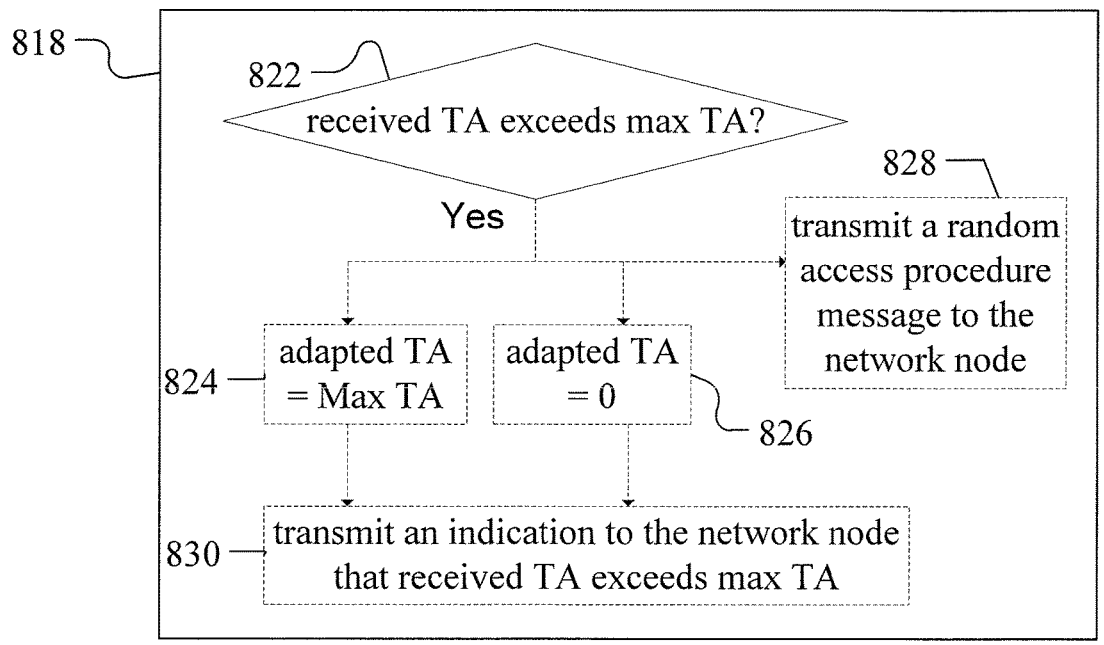
FIG. 8B is a flow diagram illustrating a more detailed example of some of the steps of FIG. 8A, according to some embodiments.

FIG. 8B is a flow diagram illustrating a more detailed example of some of the steps of FIG. 8A, according to some embodiments. More specifically, FIG. 8B is a more detailed example of step 818 of method 800 illustrated in FIG. 8A.

At step 822, the wireless device determines whether the received timing advance value is greater than the determined maximum timing advance value. If the received timing advance value is greater than the determined maximum timing advance value then the method may continue to any of optional steps 824, 826, or 828.

At optional step 824, the wireless device adapts the received timing advance value to equal the maximum timing advance value. For example, if the received timing advance command includes a timing advance value of 0.67 ms and the wireless device is operating in asynchronous dual connectivity with a maximum timing advance value of 0.136 ms, then the received timing advance may be adapted to 0.136 ms.

At optional step 826, the wireless device adapts the received timing advance value to equal 0 (i.e., no timing advance). For example, in particular embodiments the wireless device may determine not to apply the timing advance command if the received timing advance command includes a timing advance value that exceeds the maximum timing advance value corresponding to the determined synchronization level. In such embodiments the wireless device may not adjust its uplink timing based on the received timing advance command. This is equivalent to transmitting uplink signals without applying the received or adapted timing advance values to the uplink signals.

At optional step 828, the wireless device may determine to transmit a random access procedure message to the network node. For example, wireless device 110 may transmit a random access procedure message to network node 120.

In particular embodiments, the wireless device may send a random access to the network node (e.g., on MeNB via PCell and SeNB via PSCell) to receive a new timing advance command from the corresponding network node involved in dual connectivity.

In particular embodiments, not illustrated by optional steps 824, 826, and 828, the wireless device may not transmit any uplink signal. For example, in particular embodiments if the wireless device cannot apply either the adapted or received timing advance values, then the wireless device may not transmit the uplink signal. As another example, the wireless device may stop any transmission in serving cells in a cell group for which the received timing advance value is larger than the maximum timing advance value corresponding to the determined synchronization level.

In particular embodiments, the determination of whether to apply an adapted timing advance command, to not transmit an uplink signal, and/or to stop operations on particular cells may be based on an autonomous determination by the wireless device, a pre-defined rule, and/or an indication or permission from a network node.

At optional step 830, the wireless device transmits an indication to the network node that the received timing advance value exceeds a maximum timing advance value. For example, wireless device 110 may report to network node 120a that the received timing advance value exceeds a determined maximum timing advance value.

In particular embodiments, step 830 may provide feedback to the network regarding autonomous actions taken at the wireless device regarding timing advance commands. For example, in particular embodiments the wireless device may inform the network node that the wireless device has not applied the received timing advance command because it was larger than the determined maximum timing advance value or that can be handled by the wireless device under the current synchronization level. In particular embodiments, the indication may include information regarding any one of the decisions used to determine the synchronization level or maximum timing advance value described above with respect to FIG. 8A.

A network node may take one more actions based on the indication received from the network node. For example, the network node may re-estimate a synchronization level, update a timing advance value, and send an updated timing advance command to the wireless device. As another example, the network node may reduce the maximum timing advance value by a certain margin or to a lower value (e.g., setting maximum timing advance from 0.667 ms to 0.136 ms). The network node may then send an updated timing advance command to the wireless device. In particular embodiments, the network node may request the wireless device to send a random access message on one of the serving cells to re-estimate the timing advance value. As another example, the network node may change the carrier of at least one of the serving cells involved in the dual connectivity operation.

Modifications, additions, or omissions may be made to the steps illustrated in FIG. 8B. Additionally, one or more steps may be performed in parallel or in any suitable order. All or parts of the method may be repeated over time as necessary.

In the embodiments described with respect to FIGS. 8A and 8B, the wireless device determined the dual connectivity synchronization type and the maximum timing advance value. In other embodiments, the network node may determine the dual connectivity synchronization type and the maximum timing advance value.

Figure 9A:
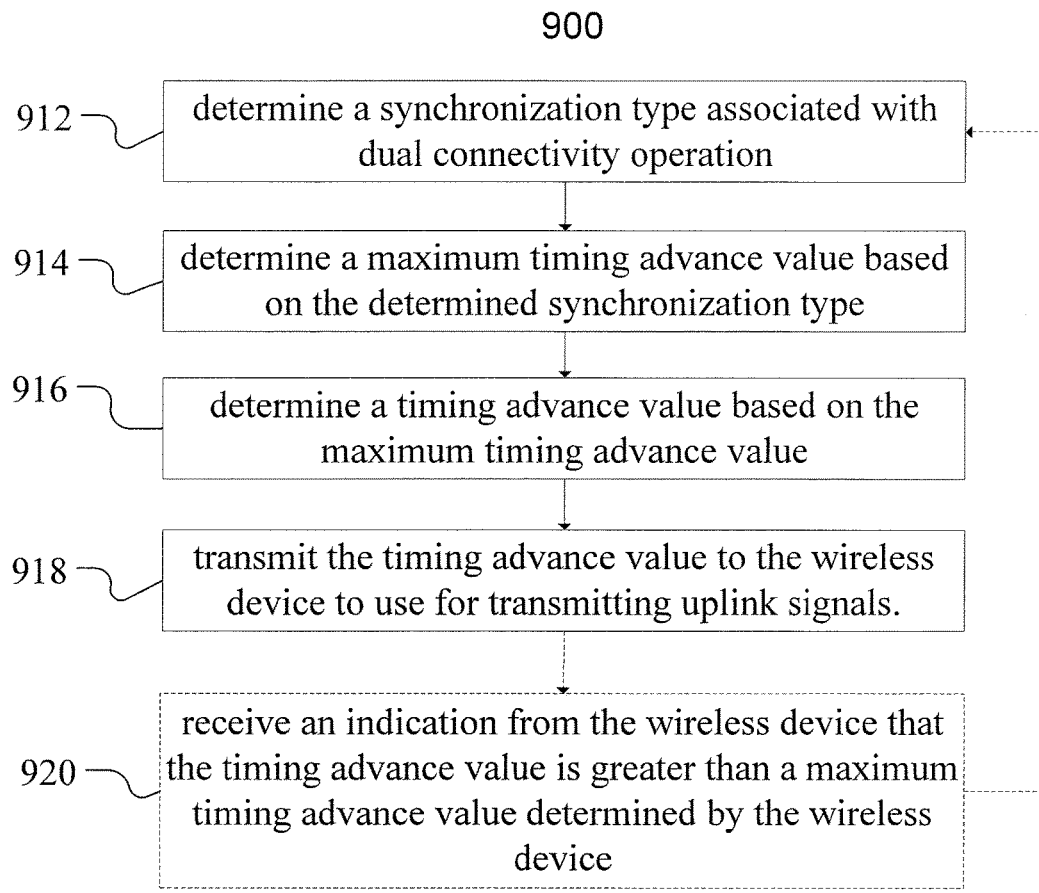
FIG. 9A is a flow diagram illustrating an example method in a network node of transmitting a timing advance command to a wireless device operating in dual connectivity, according to some embodiments.

FIG. 9A is a flow diagram illustrating an example method in a network node of transmitting a timing advance command to a wireless device operating in dual connectivity, according to some embodiments. In general, the method determines a maximum timing advance based on a dual connectivity synchronization type and adapts a timing advance command accordingly. In particular embodiments, one or more steps of FIG. 9A may be performed by a wireless device 110 of wireless network 100 described with respect to FIG. 5.

At step 912, a network node determines a synchronization type associated with dual connectivity operation. For example, network node 120a operating in dual connectivity with network node 120b and wireless device 110 may determine that the received time difference ($\Delta t$) between the signals received at wireless device 110 from the component carriers belonging to network nodes 120a and 120b is greater than 33 μs. Accordingly, network node 120a may determine that the dual connectivity synchronization type is asynchronous. In particular embodiments, network node 120 may use various mechanisms or procedures to determine the dual connectivity synchronization mode of wireless device 110.

For example, a network node may determine the synchronization mode or level based on any one or more of the following activities. In particular embodiments, the network node may determine the synchronization mode or level based on dual connectivity capability information received from the wireless device and/or another network node. The network node may estimate the synchronization mode or level based on the synchronization conditions (e.g., transmit/receive timing differences) between network nodes that are involved in the dual connectivity operation with the wireless device. The wireless device may report to the network node an estimated synchronization level of uplink and/or downlink signals from different network nodes involved in the dual connectivity operation.

As additional examples, in particular embodiments a network node may determine the synchronization mode or level based on one or more of the following activities. The wireless device capabilities for synchronous or asynchronous operation may only apply for certain frequency bands, which may be compared to the frequency bands used for the dual connectivity operation. The synchronization level or mode may be estimated based on the received time difference of signals from MeNB and SeNB ($\Delta t$) (e.g., synchronous dual connectivity if the magnitude of $\Delta t$ is less than a particular threshold, otherwise asynchronous dual connectivity operation). The synchronization mode or level may be estimated based on the uplink time difference between TAGs ($\Delta MTAG$) (e.g., synchronous dual connectivity if the magnitude of $\Delta MTAG$ is less than a particular threshold, otherwise asynchronous dual connectivity operation). Information about the wireless device receiver and/or transmitter architectures for dual connectivity operation may be used to determine the synchronization mode (e.g., if number of receivers and transmitters for dual connectivity is more than two, then the wireless device may be assumed to be capable of asynchronous dual connectivity, otherwise the wireless device may be assumed to be capable of synchronous dual connectivity. A frequency band or band combination used for dual connectivity may determine the synchronization mode (e.g., certain bands or band combinations may typically be used for synchronous mode and others for asynchronous mode). The wireless device may signal the band information to the network node.

At step 914, the network node determines a maximum timing advance value based on the determined synchronization type. For example, network node 120a operating in asynchronous dual connectivity with network node 120b and wireless device 110 may determine that the maximum timing advance value for wireless device 110 is 0.136 ms. As another example, network node 120a operating in synchronous dual connectivity with network node 120b and wireless device 110 may determine that the maximum timing advance value for wireless device 110 is 0.67 ms. While particular maximum timing advance values are given as examples, particular embodiments may use any suitable maximum timing advance value.

In particular embodiments, the network node may determine the maximum timing advance value for the particular dual connectivity synchronization level based on autonomous calculations, based on one or more pre-defined rules, such as the rules included in Tables 1 and 2 described above, or based on a recommendation received from the wireless device. For example, wireless device 110 may send an indication to network node 120a indicating a maximum timing advance value that wireless device 110 may process for its dual connectivity synchronization level.

At step 916, the network node determines a timing advance value based on the maximum timing advance value. For example, network node 120a may determine a timing advance value for wireless device 110 based on maximum timing advance value determined in the previous step. In particular embodiments, the timing advance value may be based on a propagation delay between network node 120a and wireless device 110. Network node 120a may adapt the timing advance value determined based on propagation delay to account for the determined maximum timing advance value.

For example, the network node may compare the determined timing advance value with the determined maximum timing advance value associated with the determined synchronization level of the wireless device. If the determined timing advance value is larger than maximum timing advance then the network node adapts the timing advance to a maximum timing advance value. For example in this case the network node may set timing advance to TA_max2 if the wireless device is operating in the asynchronous dual connectivity mode. Various additional examples of how a network node may determine a timing advance value are described in more detail below with respect to FIG. 9B.

At step 918 the network node transmits the timing advance value to the wireless device for use in transmitting uplink signals. For example, network node 120a may transmit a timing advance command including the adapted timing advance value to wireless device 110. Wireless device 110 may attempt to use the adapted timing advance value to transmit uplink signals to network node 120a. In particular embodiments, if wireless device 110 is unable to apply the adapted timing advance value, wireless device 110 may send an indication back to network node 120a.

At optional step 920, network node 120a receives an indication from the wireless device that the timing advance value is greater than a maximum timing advance value determined by the wireless device. In particular embodiments, the indication may include any of the information described above with respect to step 830 of FIG. 8B. In response to receiving the indication, network node 120a may perform any of the actions described above with respect to step 830 of FIG. 8B.

For example, in particular embodiments the method may optionally return to step 912 where the network node repeats the method steps using updated values. For example, network node 120a may recalculate or update any one or more of the synchronization type, maximum timing advance value, and/or timing advance value to adapt the timing advance value to a suitable value for wireless device 110.

Modifications, additions, or omissions may be made to method 900. Additionally, one or more steps in method 900 of FIG. 9A may be performed in parallel or in any suitable order. All or parts of method 900 may be repeated over time as necessary.

Figure 9B:
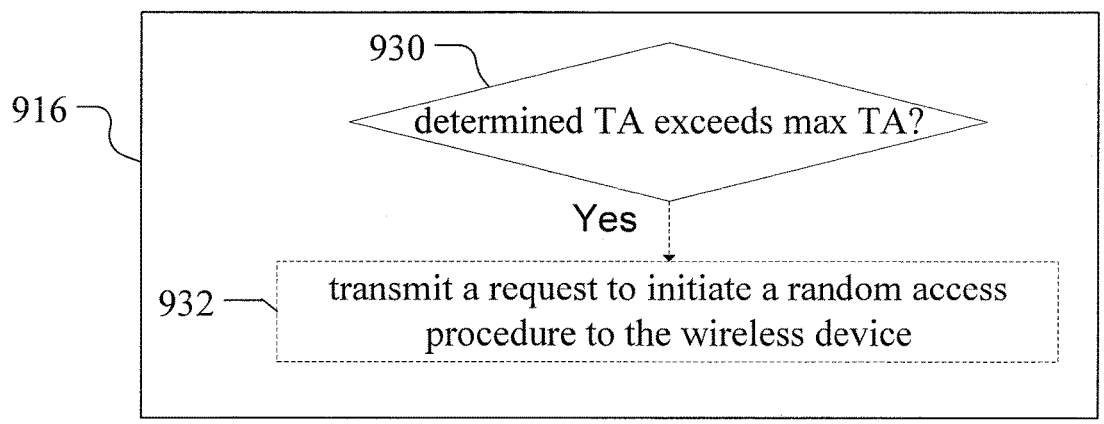
FIG. 9B is a flow diagram illustrating a more detailed example of some of the steps of FIG. 9A, according to some embodiments.

FIG. 9B is a flow diagram illustrating a more detailed example of some of the steps of FIG. 9A, according to some embodiments. More specifically, FIG. 9B is a more detailed example of step 916 of method 900 illustrated in FIG. 9A.

At step 930, the network node determines whether the determined timing advance value is greater than the determined maximum timing advance value. If the determined timing advance value is greater than the determined maximum timing advance value then the method may continue to optional step 932.

At optional step 932, the network node transmits a request to initiate a random access procedure to the wireless device. For example, network node 120a may send a request for wireless device 110 to initiate a random access procedure with one of its serving cells. This may cause one of the serving cells to re-estimate the timing advance value.

In particular embodiments, the network node may perform other tasks, not illustrated, after step 930. For example, the network node may return to step 912 to estimate again the synchronization level, the maximum timing advance value, and may send the adjusted timing advance command to the wireless device.

In particular embodiments, the network node may increase the maximum timing advance value by a certain margin or increase it to a larger value (e.g., setting the maximum timing advance value from 0.136 ms to 0.667 ms). The network node may then send the updated timing advance command to the wireless device.

In particular embodiments, the network node may change the carrier of at least one of the serving cells involved in dual connectivity operation or the network node may send a request to the wireless device for the wireless device to change one or more of its serving cells. For example, the network node may assign a new PSCell for the wireless device. In particular embodiments, the network node may stop the dual connectivity operation of the wireless device.

Modifications, additions, or omissions may be made to the steps illustrated in FIG. 9B. Additionally, one or more steps may be performed in parallel or in any suitable order. All or parts of the method may be repeated over time as necessary.

Figure 10A:
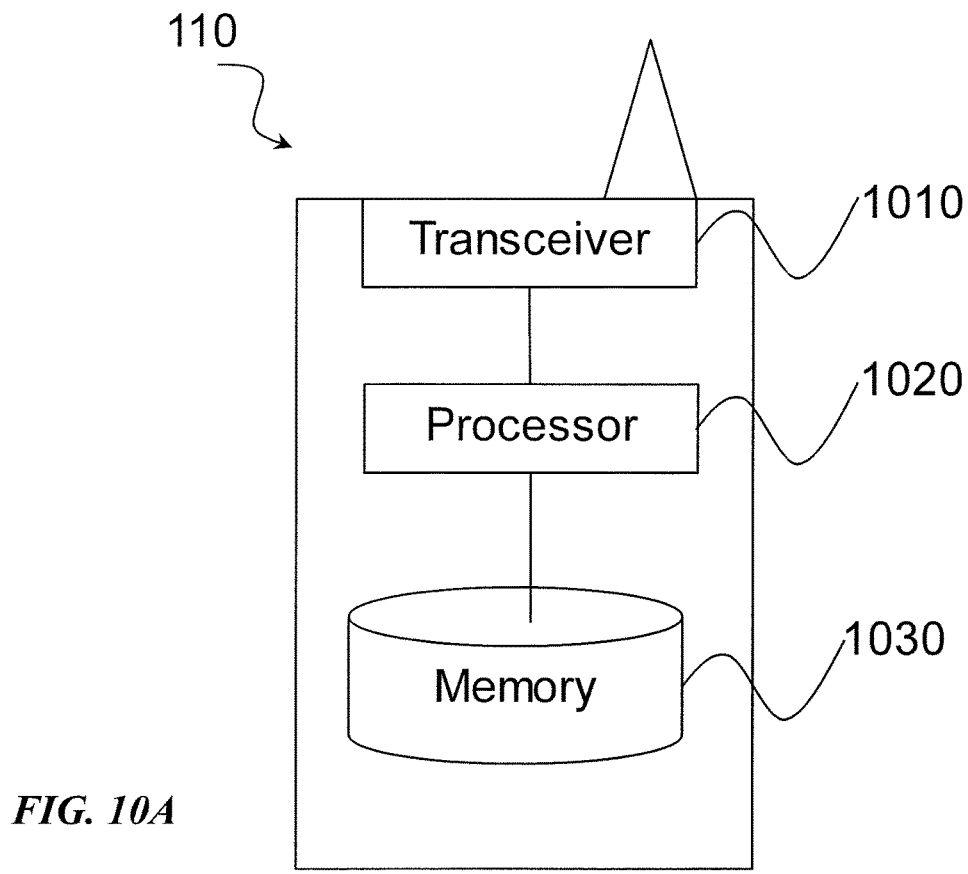
FIG. 10A is a block diagram illustrating an example embodiment of a wireless device.

FIG. 10A is a block diagram illustrating an example embodiment of a wireless device. The wireless device is an example of the wireless devices 110 illustrated in FIG. 5. The wireless device is capable of operating in dual connectivity with a plurality of network nodes in a wireless communication network. The wireless device is operable to determine a synchronization type associated with the dual connectivity operation; determine a maximum timing advance value based on the determined synchronization type; receive a timing advance value from a network node of the plurality of network nodes; determine an adapted timing advance value using the received timing advance value and the determined maximum timing advance value; and transmit an uplink radio signal using the adapted timing advance value.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1010, processor 1020, and memory 1030. In some embodiments, transceiver 1010 facilitates transmitting wireless signals to and receiving wireless signals from wireless network node 120 (e.g., via an antenna), processor 1020 executes instructions to provide some or all of the functionality described herein as provided by the wireless device, and memory 1030 stores the instructions executed by processor 1020.

Processor 1020 includes any suitable combination of hardware and software implemented in one or more integrated circuits or modules to execute instructions and manipulate data to perform some or all of the described functions of the wireless device. In some embodiments, processor 1020 may include, for example, one or more computers, one more programmable logic devices, one or more central processing units (CPUs), one or more microprocessors, one or more applications, and/or other logic, and/or any suitable combination of the preceding. Processor 1020 may include analog and/or digital circuitry configured to perform some or all of the described functions of wireless device 110. For example, processor 1020 may include resistors, capacitors, inductors, transistors, diodes, and/or any other suitable circuit components.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1020 in communication with transceiver 1010 determines a synchronization type associated with dual connectivity operation, determines a maximum timing advance value based on the determined synchronization type, receives a timing advance value from a network node, determines an adapted timing advance value, and transmits an uplink radio signal using the adapted timing advance value.

Other embodiments of the wireless device may include additional components (beyond those shown in FIG. 10A) responsible for providing certain aspects of the wireless device's functionality, including any of the functionality described above and/or any additional functionality (including any functionality necessary to support the solution described above).

Figure 10B:
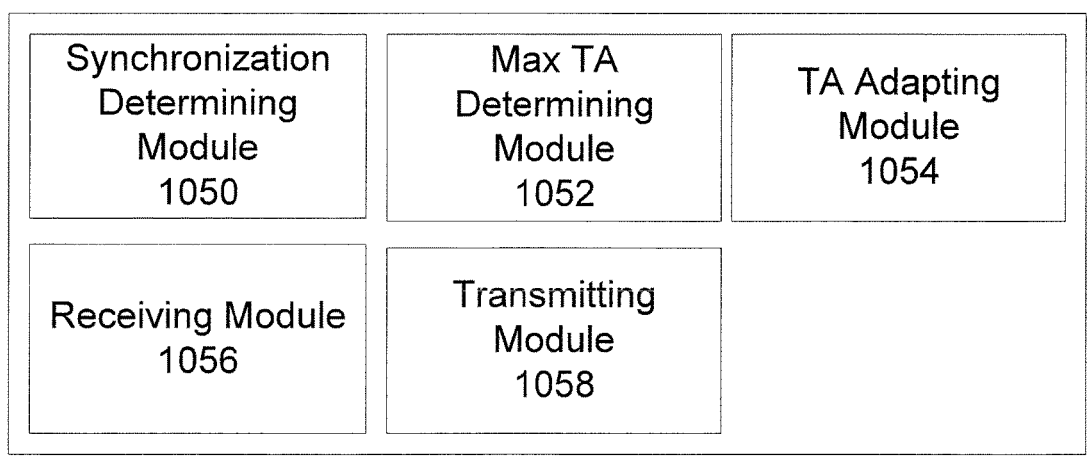
FIG. 10B is a block diagram illustrating example components of a wireless device.

FIG. 10B is a block diagram illustrating example components of a wireless device 110. The components may include synchronization determining module 1050, maximum timing advance determining module 1052, timing advance adapting module 1054, receiving module 1056, and transmitting module 1058.

Synchronization determining module 1050 may perform the synchronization determining functions of wireless device 110. For example, synchronization determining module 1050 may determine a synchronization type associated with the dual connectivity operation of wireless device 110. In particular embodiments, determining the synchronization type may be based on wireless device dual connectivity capability, wireless device transmit/receive architecture, receive time difference, MTAG, frequency band combination used for dual connectivity, etc. In certain embodiments, synchronization determining module 1050 may include or be included in processor 1020. In particular embodiments, synchronization determining module 1050 may communicate with maximum timing advance determining module 1052, timing advance adapting module 1054, receiving module 1056, and transmitting module 1058.

Maximum timing advance determining module 1052 may perform the maximum timing advance determining functions of wireless device 110. For example, maximum timing advance determining module 1052 may determine a maximum timing advance value based on the determined synchronization type. In particular embodiments, determining the maximum timing advance value may include receiving the value from a network node, determining the value based on processing power of the wireless device, determining the value based on measuring receive time differences between network nodes, and/or based on a predefined mapping. In certain embodiments, maximum timing advance determining module 1052 may include or be included in processor 1020. In particular embodiments, maximum timing advance determining module 1052 may communicate with synchronization determining module 1050, timing advance adapting module 1054, receiving module 1056, and transmitting module 1058.

Timing advance adapting module 1054 may perform the timing advance adapting functions of wireless device 110. For example, timing advance adapting module 1054 may determine an adapted timing advance value using a received timing advance value and the determined maximum timing advance value. In particular embodiments, the adapted timing advance value may equal the maximum timing advance value, a no timing advance value, or any other suitable timing advance value for wireless device 110. In certain embodiments, timing advance adapting module 1054 may include or be included in processor 1020. In particular embodiments, timing advance adapting module 1054 may communicate with synchronization determining module 1050, maximum timing advance determining module 1052, receiving module 1056, and transmitting module 1058.

Receiving module 1056 may perform the receiving functions of wireless device 110. For example, receiving module 1056 may receive a timing advance value from network node 120. In certain embodiments, receiving module 1056 may include or be included in processor 1020. Receiving module 1056 may include circuitry configured to receive radio signals. In particular embodiments, receiving module 1056 may communicate with synchronization determining module 1050, maximum timing advance determining module 1052, timing advance adapting module 1054, and transmitting module 1058.

Transmitting module 1058 may perform the transmitting functions of wireless device 110. For example, transmitting module 1058 may transmit uplink signals and other notifications to network node 120. In certain embodiments, transmitting module 1058 may include or be included in processor 1020. Transmitting module 1058 may include circuitry configured to transmit radio signals. In particular embodiments, transmitting module 1058 may communicate with synchronization determining module 1050, maximum timing advance determining module 1052, timing advance adapting module 1054, and receiving module 1056.

Figure 11A:
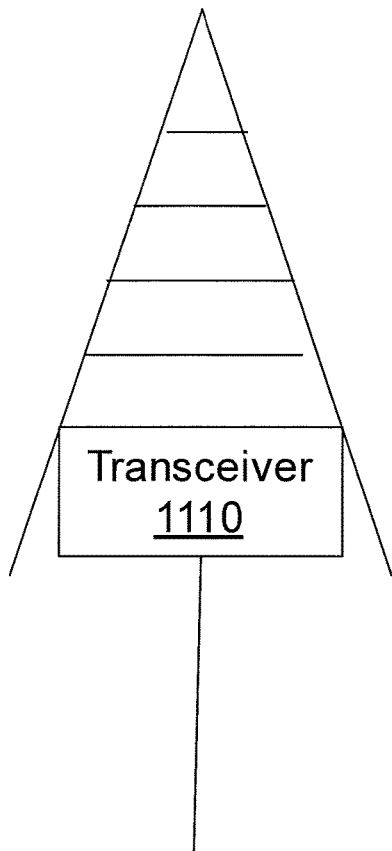
FIG. 11A is a block diagram illustrating an example embodiment of a network node.
Figure 11A:
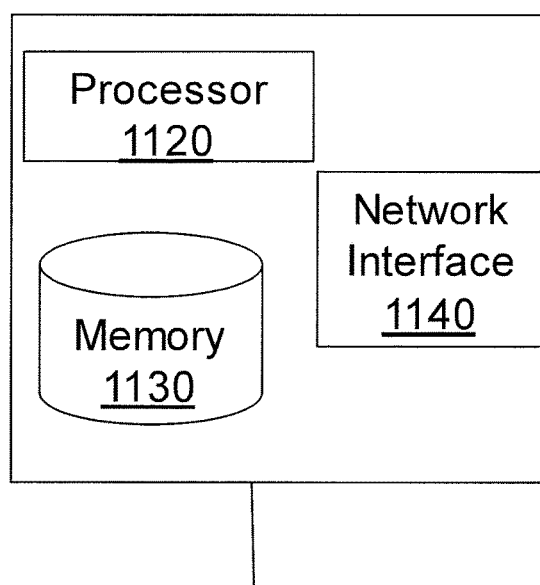

FIG. 11A is a block diagram illustrating an example embodiment of a network node. The network node is an example of the network node 120 illustrated in FIG. 5. The network node is capable of serving a wireless device operating in dual connectivity with a plurality of network nodes in a wireless communication network. The network node is operable to determine a synchronization type associated with the dual connectivity operation; determine a maximum timing advance value based on the determined synchronization type; determine a timing advance value based on the maximum timing advance value; and transmit the timing advance value to the wireless device for the wireless device to use for transmitting uplink signals.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 1110, at least one processor 1120, at least one memory 1130, and at least one network interface 1140. Transceiver 1110 facilitates transmitting wireless signals to and receiving wireless signals from a wireless device, such as wireless devices 110 (e.g., via an antenna); processor 1120 executes instructions to provide some or all of the functionality described above as being provided by a network node 120; memory 1130 stores the instructions executed by processor 1120; and network interface 1140 communicates signals to backend network components, such as a gateway, switch, router, Internet, Public Switched Telephone Network (PSTN), controller, and/or other network nodes 120. Processor 1120 and memory 1130 can be of the same types as described with respect to processor 1020 and memory 1030 of FIG. 10A above.

In some embodiments, network interface 1140 is communicatively coupled to processor 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network.

In particular embodiments, processor 1120 in communication with transceiver 1110 determines a synchronization type associated with dual connectivity operation; determines a maximum timing advance value based on the determined synchronization type; determines a timing advance value based on the maximum timing advance value; and transmits the timing advance value to the wireless device.

Other embodiments of network node 120 include additional components (beyond those shown in FIG. 11A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 11B:
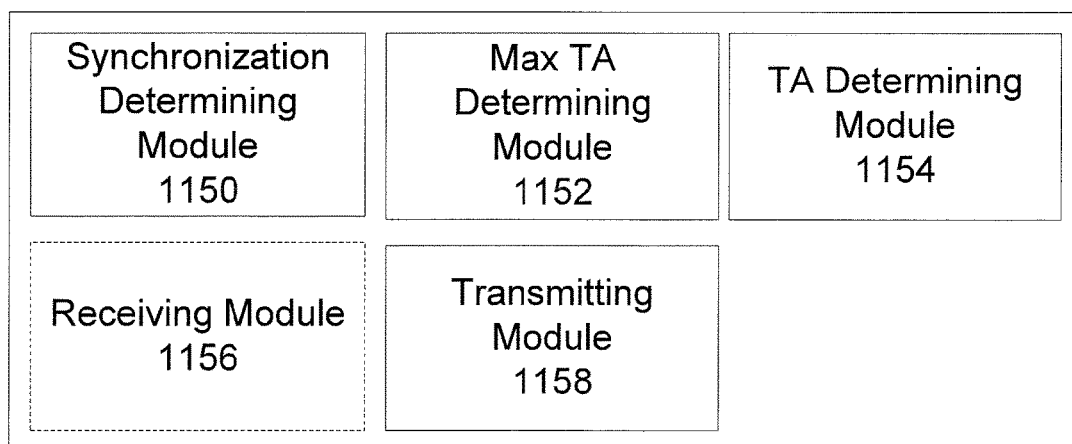
FIG. 11B is a block diagram illustrating example components of a network node.

FIG. 11B is a block diagram illustrating example components of a network node 120. The components may include synchronization determining module 1150, maximum timing advance determining module 1152, timing advance determining module 1154, receiving module 1156, and transmitting module 1158.

Synchronization determining module 1150 may perform the synchronization determining functions of network node 120. For example, synchronization determining module 1150 may determine a synchronization type associated with the dual connectivity operation of wireless device 110. In particular embodiments, determining the synchronization type may be based on wireless device dual connectivity capability, wireless device transmit/receive architecture, receive time difference, MTAG, frequency band combination used for dual connectivity, etc. In certain embodiments, synchronization determining module 1150 may include or be included in processor 1120. In particular embodiments, synchronization determining module 1150 may communicate with maximum timing advance determining module 1152, timing advance determining module 1154, receiving module 1156, and transmitting module 1158.

Maximum timing advance determining module 1152 may perform the maximum timing advance determining functions of network node 120. For example, maximum timing advance determining module 1152 may determine a maximum timing advance value based on the determined synchronization type. In particular embodiments, determining the maximum timing advance value may include receiving the value from a wireless device, determining the value based on processing power of the wireless device, determining the value based on measuring receive time differences between network nodes, and/or based on a predefined mapping. In certain embodiments, maximum timing advance determining module 1052 may include or be included in processor 1020. In particular embodiments, maximum timing advance determining module 1052 may communicate with synchronization determining module 1050, timing advance adapting module 1054, receiving module 1056, and transmitting module 1058.

Timing advance determining module 1154 may perform the timing advance determining functions of network node 120. For example, timing advance determining module 1154 may determine a timing advance value using a propagation delay and the determined maximum timing advance value. In particular embodiments, the determined timing advance value may equal the maximum timing advance value, a no timing advance value, or any other suitable timing advance value for wireless device 110. In certain embodiments, timing advance determining module 1154 may include or be included in processor 1120. In particular embodiments, timing advance determining module 1154 may communicate with synchronization determining module 1150, maximum timing advance determining module 1152, receiving module 1156, and transmitting module 1158.

Receiving module 1156 may perform the receiving functions of network node 120. For example, receiving module 1156 may receive uplink signals and other notifications from wireless device 110. In certain embodiments, receiving module 1156 may include or be included in processor 1120. Receiving module 1156 may include circuitry configured to receive radio signals. In particular embodiments, receiving module 1156 may communicate with synchronization determining module 1150, maximum timing advance determining module 1152, timing advance determining module 1154, and transmitting module 1158.

Transmitting module 1158 may perform the transmitting functions of network node 120. For example, transmitting module 1158 may transmit timing advance commands to wireless device 110. In certain embodiments, transmitting module 1158 may include or be included in processor 1120. Transmitting module 1158 may include circuitry configured to transmit radio signals. In particular embodiments, transmitting module 1158 may communicate with synchronization determining module 1150, maximum timing advance determining module 1152, timing advance determining module 1154, and receiving module 1156.

Some embodiments of the disclosure may provide one or more technical advantages. As an example, some embodiments change the allowable maximum timing advance for asynchronous dual connectivity operation, which provides a wireless device sufficient time to process an uplink transmission in dual connectivity without increasing the complexity or processing power of the wireless device. Particular embodiments may adjust the maximum timing advance value based on the wireless device capability or based on a current synchronization and operating scenario (e.g., maximum required cell range, wireless device distance from the network node, etc.) Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

| Abbreviations used in the preceding description include: | |
| --- | --- |
| 3GPP | Third Generation Partnership Project |
| BSR | Buffer Status Report |
| BTS | Base Transceiver Station |
| D2D | Device to Device |
| eNB | eNodeB |
| FDD | Frequency Division Duplex |
| LTE | Long Term Evolution |
| M2M | Machine to Machine |
| MeNB | Master eNodeB |
| MCG | Master Cell Group |
| MIMO | Multi-Input Multi-Output |
| MRTD | Maximum Receive Timing Difference |
| MTC | Machine Type Communication |
| PCC | Primary component carrier |
| PCell | Primary Cell |
| PSCell | Primary SCell |
| RAN | Radio Access Network |
| RAT | Radio Access Technology |
| RRH | Remote Radio Head |
| RRU | Remote Radio Unit |
| SCell | Secondary Cell |
| SCG | Secondary Cell Group |
| SeNB | Secondary eNodeB |
| SFN | System Frame Number |
| SIB | System Information Block |
| SSTD | System frame number and Subframe Time Difference |
| TAG | Timing Advance Group |
| TDD | Time division duplex |
| UE | User Equipment |
| WAN | Wireless Access Network |

The invention claimed is:

1. A method in a wireless device operating in dual connectivity with simultaneous connections to a plurality of network nodes in a wireless communication network, wherein at least one of the plurality of network nodes comprises a dual connectivity master network node and the remaining network nodes comprise dual connectivity secondary network nodes and wherein the simultaneous connections provide data aggregation to the wireless device, the method comprising:
   determining a synchronization type associated with the dual connectivity operation of the wireless device and the plurality of network nodes, wherein the synchronization type is one of an asynchronous dual connectivity operation when a received time difference at the wireless device is above a threshold time difference or a synchronous dual connectivity operation when the received time difference at the wireless device is below the threshold time difference;
   determining a maximum timing advance value based on the determined synchronization type;
   receiving a timing advance value from a network node of the plurality of network nodes;
   determining an adapted timing advance value using the received timing advance value and the determined maximum timing advance value; and
   transmitting an uplink radio signal using the adapted timing advance value.

2. The method of claim 1, wherein determining the adapted timing advance value using the received timing advance value and the determined maximum timing advance value comprises:
   determining the received timing advance value is greater than the determined maximum timing advance value; and
   setting the adapted timing advance value equal to the maximum timing advance value.

3. The method of claim 1, wherein determining the adapted timing advance value using the received timing advance value and the determined maximum timing advance value comprises:
   determining the received timing advance value is greater than the determined maximum timing advance value; and
   setting the adapted timing advance value equal to no timing advance.

4. The method of claim 1, further comprising transmitting an indication to the network node of the plurality of network nodes that the received timing advance value is greater than the determined maximum timing advance value.

5. The method of claim 1, wherein determining the adapted timing advance value using the received timing advance value and the determined maximum timing advance value comprises:
   determining the received timing advance value is greater than the determined maximum timing advance value; and
   transmitting a random access message to the network node of the plurality of network nodes.

6. The method of claim 1, wherein determining the adapted timing advance value using the received timing advance value and the determined maximum timing advance value comprises:
   determining the received timing advance value is greater than the determined maximum timing advance value; and
   stopping transmission of uplink signals.

7. The method of claim 1, wherein the determined synchronization type associated with the dual connectivity operation is synchronous and the determined maximum timing advance value is approximately 0.67 milliseconds.

8. The method of claim 1, wherein the determined synchronization type associated with the dual connectivity operation is asynchronous and the determined maximum timing advance value is approximately 0.136 milliseconds.

9. A method in a network node serving a wireless device operating in dual connectivity with simultaneous connections to a plurality of network nodes in a wireless communication network, wherein at least one of the plurality of network nodes comprises a dual connectivity master network node and the remaining network nodes comprise dual connectivity secondary network nodes and wherein the simultaneous connections provide data aggregation to the wireless device, the method comprising:

determining a synchronization type associated with the dual connectivity operation of the wireless device and the plurality of network nodes, wherein the synchronization type is one of an asynchronous dual connectivity operation when a received time difference at the wireless device is above a threshold time difference or a synchronous dual connectivity operation when the received time difference at the wireless device is below the threshold time difference determining a maximum timing advance value based on the determined synchronization type;

determining a timing advance value based on the maximum timing advance value; and transmitting the timing advance value to the wireless device for the wireless device to use for transmitting uplink signals.

10. The method of claim 9, further comprising:

receiving an indication from the wireless device that the timing advance value is greater than a maximum timing advance value determined by the wireless device; and adapting the timing advance value using an updated maximum timing advance value.

11. The method of claim 9, further comprising:

determining the timing advance value is greater than the determined maximum timing advance value; and transmitting, to the wireless device, a request to change a serving cell of the wireless device.

12. The method of claim 9, further comprising:

determining the timing advance value is greater than the determined maximum timing advance value; and transmitting, to the wireless device, a request to initiate a random access procedure.

13. The method of claim 9, wherein the determined synchronization type associated with the dual connectivity operation is synchronous and the determined maximum timing advance value is approximately 0.67 milliseconds.

14. The method of claim 9, wherein the determined synchronization type associated with the dual connectivity operation is asynchronous and the determined maximum timing advance value is approximately 0.136 milliseconds.

15. A wireless device capable of operating in dual connectivity with simultaneous connections to a plurality of network nodes in a wireless communication network, wherein at least one of the plurality of network nodes comprises a dual connectivity master network node and the remaining network nodes comprise dual connectivity secondary network nodes and wherein the simultaneous connections provide data aggregation to the wireless device, the wireless device comprising a processor and a memory, the processor operable to:

determine a synchronization type associated with the dual connectivity operation of the wireless device and the plurality of network nodes, wherein the synchronization type is one of an asynchronous dual connectivity operation when a received time difference at the wireless device is above a threshold time difference or a synchronous dual connectivity operation when the received time difference at the wireless device is below the threshold time difference;

determine a maximum timing advance value based on the determined synchronization type;

receive a timing advance value from a network node of the plurality of network nodes;

determine an adapted timing advance value using the received timing advance value and the determined maximum timing advance value; and transmit an uplink radio signal using the adapted timing advance value.

16. The wireless device of claim 15, wherein the processor is operable to:

determine the received timing advance value is greater than the determined maximum timing advance value; and set the adapted timing advance value equal to the maximum timing advance value.

17. The wireless device of claim 15, wherein the processor is operable to:

determine the received timing advance value is greater than the determined maximum timing advance value; and set the adapted timing advance value equal to no timing advance.

18. The wireless device of claim 15, wherein the processor is operable to:

determine the received timing advance value is greater than the determined maximum timing advance value; and stop transmission of uplink signals.

19. The wireless device of claim 15, wherein the processor is operable to transmit an indication to the network node of the plurality of network nodes that the received timing advance value is greater than the determined maximum timing advance value.

20. The wireless device of claim 15, wherein the processor is operable to:

determine the received timing advance value is greater than the determined maximum timing advance value; and transmit a random access procedure message to the network node of the plurality of network nodes.

21. The wireless device of claim 15, wherein the determined synchronization type associated with the dual connectivity operation is synchronous and the determined maximum timing advance value is approximately 0.67 milliseconds.

22. The wireless device of claim 15, wherein the determined synchronization type associated with the dual connectivity operation is asynchronous and the determined maximum timing advance value is approximately 0.136 milliseconds.

23. A network node capable of serving a wireless device operating in dual connectivity with simultaneous connections to a plurality of network nodes in a wireless communication network, wherein at least one of the plurality of network nodes comprises a dual connectivity master network node and the remaining network nodes comprise dual connectivity secondary network nodes and wherein the simultaneous connections provide data aggregation to the wireless device, the network node comprising a processor and a memory, the processor operable to:

determine a synchronization type associated with the dual connectivity operation of the wireless device and the plurality of network nodes, wherein the synchronization type is one of an asynchronous dual connectivity operation when a received time difference at the wireless device is above a threshold time difference or a synchronous dual connectivity operation when the received time difference at the wireless device is below the threshold time difference;

determine a maximum timing advance value based on the determined synchronization type;

determine a timing advance value based on the maximum timing advance value; and transmit the timing advance value to the wireless device for the wireless device to use for transmitting uplink signals.

24. The network node of claim 23, wherein the processor is further operable to:

receive an indication from the wireless device that the timing advance value is greater than a maximum timing advance value determined by the wireless device; and adapt the timing advance value using an updated maximum timing advance value.

25. The network node of claim 23, wherein the processor is further operable to:

determine the timing advance value is greater than the determined maximum timing advance value; and transmit, to the wireless device, a request to initiate a random access procedure.

26. The network node of claim 23, wherein the processor is further operable to:

determine the timing advance value is greater than the determined maximum timing advance value; and transmit, to the wireless device, a request to change a serving cell of the wireless device.

27. The network node of claim 23, wherein the determined synchronization type associated with the dual connectivity operation is synchronous and the determined maximum timing advance value is approximately 0.67 milliseconds.

28. The network node of claim 23, wherein the determined synchronization type associated with the dual connectivity operation is asynchronous and the determined maximum timing advance value is approximately 0.136 milliseconds.

* * * * *